(12) United States Patent
Takahashi et al.

(10) Patent No.: US 9,056,296 B2
(45) Date of Patent: Jun. 16, 2015

(54) APPARATUS FOR MANUFACTURING FINE PARTICLES AND TONER

(71) Applicants: Satoshi Takahashi, Kanagawa (JP);
Yoshihiro Norikane, Kanagawa (JP);
Yasutada Shitara, Shizuoka (JP);
Kiyotada Katoh, Shizuoka (JP);
Minoru Masuda, Shizuoka (JP)

(72) Inventors: Satoshi Takahashi, Kanagawa (JP);
Yoshihiro Norikane, Kanagawa (JP);
Yasutada Shitara, Shizuoka (JP);
Kiyotada Katoh, Shizuoka (JP);
Minoru Masuda, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/854,317

(22) Filed: Apr. 1, 2013

(65) Prior Publication Data
US 2013/0273188 A1    Oct. 17, 2013

(30) Foreign Application Priority Data

Apr. 16, 2012  (JP) .................................. 2012-092826
Sep. 28, 2012  (JP) .................................. 2012-215566

(51) Int. Cl.
*B01J 2/06* (2006.01)
*B01J 2/04* (2006.01)
*B01J 2/18* (2006.01)
*G03G 9/08* (2006.01)

(52) U.S. Cl.
CPC .... *B01J 2/06* (2013.01); *B01J 2/04* (2013.01); *B01J 2/18* (2013.01); *G03G 9/0804* (2013.01); *G03G 9/081* (2013.01)

(58) Field of Classification Search
CPC .................. B01J 2/04; B01J 2/06; B01J 2/18

USPC ................................................. 264/13; 425/7
See application file for complete search history.

(56) References Cited

U.S. PATENT DOCUMENTS 5,253,517 A * 10/1993 Molin et al. ................ 73/114.32
2006/0142425 A1   6/2006 Akioka et al.
2007/0275315 A1  11/2007 Nagatomo et al.
2007/0281236 A1  12/2007 Watanabe et al.
(Continued)

FOREIGN PATENT DOCUMENTS

CN    101542396 A    9/2009
JP    57-201248      12/1982
(Continued)

OTHER PUBLICATIONS

Extended European Search Report issued Aug. 23, 2013 in Patent Application No. 13163858.7.
(Continued)

Primary Examiner — Timothy Kennedy
(74) Attorney, Agent, or Firm — Oblon, McClelland, Maier & Neustadt, L.L.P.

(57) ABSTRACT

An apparatus for manufacturing fine particles is provided. The apparatus includes a liquid droplet discharge device and a liquid droplet solidification device. The liquid droplet discharge device has multiple nozzles. The liquid droplet discharge device is adapted to discharge a liquid from the multiple nozzles to form the liquid into liquid droplets. The liquid comprises a solvent in which constituents of the fine particles are dissolved or dispersed or a melt of constituents of the fine particles. The liquid droplet solidification device is adapted to solidify the liquid droplets by an airflow. The multiple nozzles are arranged in a manner such that each of the nozzles does not overlap each other relative to a direction of the airflow.

18 Claims, 13 Drawing Sheets

(56) References Cited

U.S. PATENT DOCUMENTS

| | | |
|---|---|---|
| 2007/0281237 A1 | 12/2007 | Iwamoto et al. |
| 2008/0063971 A1 | 3/2008 | Watanabe et al. |
| 2008/0118855 A1 | 5/2008 | Nakayama et al. |
| 2008/0261131 A1 | 10/2008 | Nakayama et al. |
| 2008/0286680 A1 | 11/2008 | Norikane et al. |
| 2009/0117486 A1 | 5/2009 | Watanabe et al. |
| 2009/0170018 A1 | 7/2009 | Kuramoto et al. |
| 2009/0239170 A1 | 9/2009 | Honda et al. |
| 2009/0297973 A1 | 12/2009 | Iwamoto et al. |
| 2009/0325100 A1 | 12/2009 | Watanabe et al. |
| 2010/0003613 A1 | 1/2010 | Honda et al. |
| 2010/0021209 A1 | 1/2010 | Watanabe et al. |
| 2010/0104970 A1 | 4/2010 | Norikane et al. |
| 2010/0227267 A1 | 9/2010 | Shitara et al. |
| 2011/0014565 A1 | 1/2011 | Norikane et al. |
| 2011/0305987 A1 | 12/2011 | Yohichiroh et al. |
| 2012/0070777 A1 | 3/2012 | Makabe et al. |
| 2012/0094231 A1 | 4/2012 | Norikane et al. |
| 2012/0264049 A1 | 10/2012 | Masuda et al. |
| 2012/0270147 A1 | 10/2012 | Katoh et al. |
| 2012/0270148 A1 | 10/2012 | Norikane et al. |
| 2013/0010035 A1 | 1/2013 | Norikane et al. |
| 2013/0034810 A1 | 2/2013 | Norikane et al. |
| 2013/0069262 A1 | 3/2013 | Mulwa et al. |

FOREIGN PATENT DOCUMENTS

| | | | |
|---|---|---|---|
| JP | 2003-262976 | | 9/2003 |
| JP | 2003-262977 | | 9/2003 |
| JP | 2007-199463 | | 8/2007 |
| JP | 2008-292976 | | 12/2008 |
| JP | 2010-102195 | | 5/2010 |
| JP | 2011-212668 | | 10/2011 |
| WO | WO 2008/114655 A1 | | 9/2008 |
| WO | WO 2011115303 | * | 9/2011 |

OTHER PUBLICATIONS

Combined Chinese Office Action and Search Report issued Dec. 3, 2014 in Patent Application No. 201310250947.3 (with English language Translation of Category of Cited Documents).

* cited by examiner

PRESSURE DISTRIBUTION
VELOCITY DISTRIBUTION
CLOSED AT ONE END
N=1
L=λ/4

CLOSED AT BOTH ENDS
N=2
L=λ/2

OPEN AT BOTH ENDS
N=2
L=λ/2

CLOSED AT ONE END
N=3
L=3λ/4

APPARATUS FOR MANUFACTURING FINE PARTICLES AND TONER

CROSS-REFERENCE TO RELATED APPLICATIONS

This patent application is based on and claims priority pursuant to 35 U.S.C. §119 to Japanese Patent Application Nos. 2012-092826 and 2012-215566, filed on Apr. 16, 2012 and Sep. 28, 2012, in the Japan Patent Office, the entire disclosure of each of which is hereby incorporated by reference herein.

BACKGROUND

1. Technical Field

The present disclosure relates to an apparatus for manufacturing fine particles and toner.

2. Description of Related Art

Toner for developing electrostatic charge image in electrophotographic apparatuses, such as copier, printer, and facsimile machine, have been mainly manufactured by so-called pulverization methods so far. Recently, in addition to pulverization methods, polymerization methods have been also widely employed that produces toner particles in aqueous media. A toner manufactured by a polymerization method is generally called as a polymerization toner, or a chemical toner in some countries.

A polymerization method is generally accompanied by a polymerization reaction of raw materials of toner at or through the process of formation of toner particles. Various polymerization methods have been put into practical use: such as suspension polymerization, emulsion aggregation, polymer suspension (polymer aggregation), and ester elongation methods.

Polymerization toners generally have smaller particle diameter, narrower particle diameter distribution, and more spherical shape than pulverization toners. Such properties of polymerization toners are advantageous in producing high quality images in electrophotography. But on the other hand, polymerization methods require a long time period for completing the polymerization. Also, polymerization methods require a process for separating the resultant toner particles from solvent and repeatedly washing and drying them while consuming lots of time, water, and energy.

Injection granulation methods are known in which raw materials of toner are dissolved or dispersed in an organic solvent, the resulting liquid (hereinafter "toner constituents liquid") is atomized, and the atomized particles are dried into toner particles. (For example, JP-3786034-B2 (corresponding to JP-2003-262976-A), JP-3786035-B2 (corresponding to JP-2003-262977-A), and JP-57-201248-A.) In injection granulation methods, the processes for washing and drying toner particles can be eliminated because water is not used. Therefore, injection granulation methods can avoid the problem caused in polymerization methods.

In toner manufacturing methods described in JP-3786034-B2, JP-3786035-B2, and JP-57-201248-A, liquid droplets are discharged from nozzles. The size of each liquid droplet corresponds to the size of each nozzle. In these methods, some liquid droplets may coalesce with each other before being dried and the coalesced particles may be dried into toner particles. As a result, the particle size distribution of the toner particles is ineluctably widened, which is undesirable.

A method of manufacturing fine particles and toner described in JP-2011-212668-A employs injection granulation using liquid column resonance. This method can produce toner particles having a narrow particle size distribution at a high degree of efficiency without wasting energy.

However, in this method, because multiple nozzles are arranged in parallel with the direction of feed of airflow, discharged liquid droplets, containing fine particle constituents, are likely to intersect and coalesce with each other before reaching an area in which they are dried and solidified.

SUMMARY

In accordance with some embodiments, an apparatus for manufacturing fine particles is provided. The apparatus includes a liquid droplet discharge device and a liquid droplet solidification device. The liquid droplet discharge device has multiple nozzles. The liquid droplet discharge device is adapted to discharge a liquid from the multiple nozzles to form the liquid into liquid droplets. The liquid comprises a solvent in which constituents of the fine particles are dissolved or dispersed or a melt of constituents of the fine particles. The liquid droplet solidification device is adapted to solidify the liquid droplets by an airflow. The multiple nozzles are arranged in a manner such that each of the nozzles does not overlap each other relative to a direction of the airflow.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
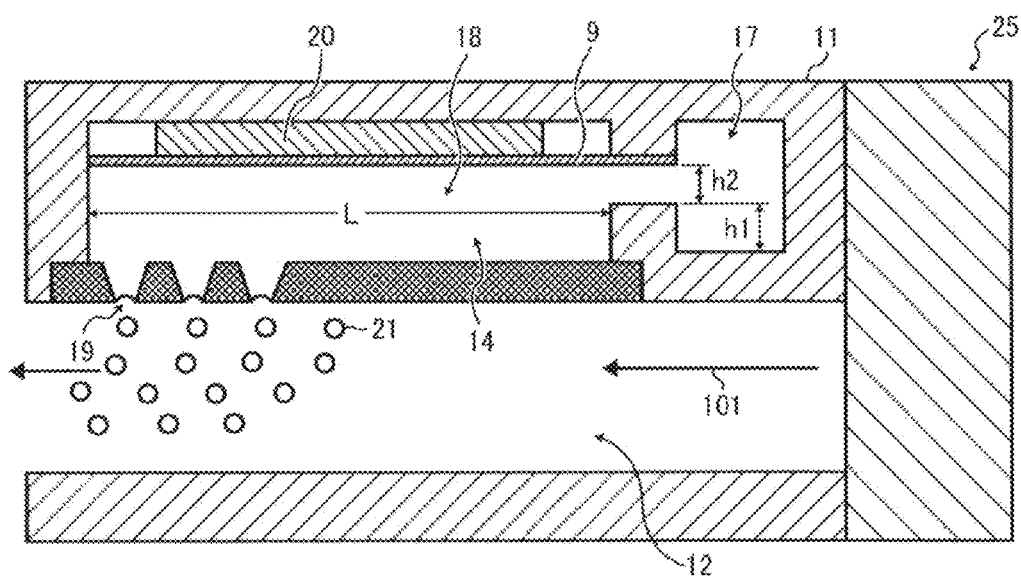
FIG. 1 is a schematic view of a liquid column resonance liquid droplet discharge device according to an embodiment.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

For the sake of simplicity, the same reference number will be given to identical constituent elements such as parts and materials having the same functions and redundant descriptions thereof omitted unless otherwise stated.

In view of the above situation, one aspect according to one embodiment of the invention provides an apparatus and method for manufacturing fine particles and toner employing an injection granulation method that prevents discharged liquid droplets from coalescing with each other, to provide fine particles or toner having a narrow particle diameter distribution.

An apparatus and method for manufacturing fine particles and toner according to some embodiments prevent liquid droplets from coalescing with each other to provide fine particles or toner having a very narrow particle diameter distribution.

An apparatus for manufacturing fine particles includes a liquid droplet discharge device and a liquid droplet solidification device. The liquid droplet discharge device has multiple nozzles. The liquid droplet discharge device is adapted to discharge a liquid from the multiple nozzles to form the liquid into liquid droplets. The liquid comprises a solvent in which constituents of the fine particles are dissolved or dispersed or a melt of constituents of the fine particles. The liquid droplet solidification device is adapted to solidify the liquid droplets by an airflow. The multiple nozzles are arranged in a manner such that each of the nozzles does not overlap each other relative to a direction of the airflow. When the liquid, comprising a solvent in which constituents of the fine particles are dissolved or dispersed or a melt of constituents of the fine particles, is a toner constituents liquid containing a resin, the above apparatus serves as an apparatus for manufacturing toner.

An apparatus for manufacturing toner according to an embodiment is described in detail below with reference to FIGS. 1 to 10. An apparatus for manufacturing toner according to an embodiment includes a liquid droplet discharge device, a liquid droplet solidification device, and a solidified particle collection device.

A liquid droplet discharge device is not limited to a particular device so long as the particle diameter distribution of the discharged liquid droplets is narrow. Specific examples of the liquid droplet discharge device include, but are not limited to, single-fluid nozzles, two-fluid nozzles, film-vibration-type discharge devices, Rayleigh-fission-type discharge devices, liquid-vibration-type discharge devices, and liquid-column-resonance-type discharge devices. For example, a film-vibration-type discharge device is described in JP-2008-292976-A, a Rayleigh-fission-type discharge device is described in JP-4647506-B2 (corresponding to JP-2007-199463-A), and a liquid-vibration-type discharge device is described in JP-2010-102195-A.

One method to narrow particle diameter distribution of liquid droplets and to secure productivity of resulting fine particle includes applying vibration to a liquid contained in a liquid column resonance liquid chamber to which multiple nozzles are formed to form a liquid column resonant standing wave therein; and discharging the liquid from the nozzles formed within an area corresponding to antinodes of the liquid column resonant standing wave.

Figure 14:
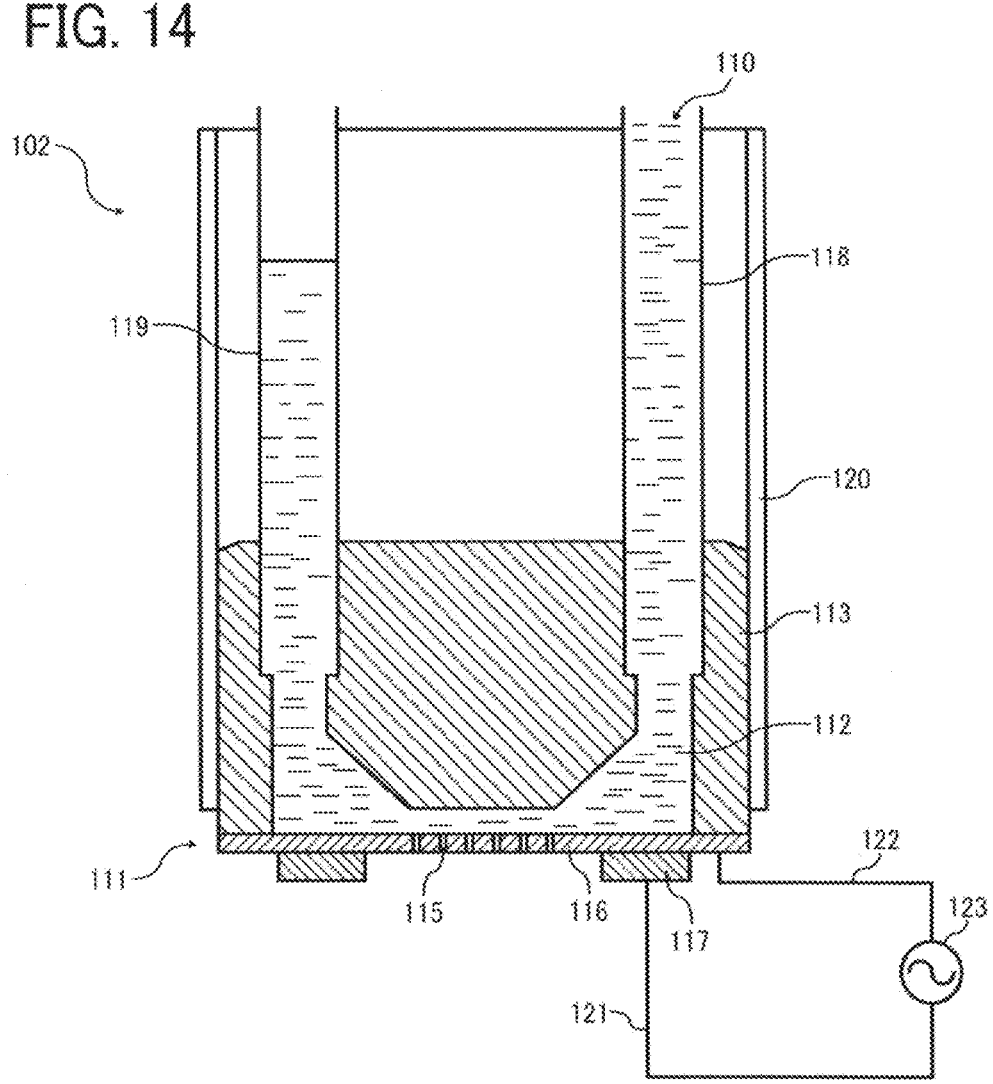
FIG. 14 is a cross-sectional view of a film-vibration-type liquid droplet discharge device according to an embodiment.
Figure 15:
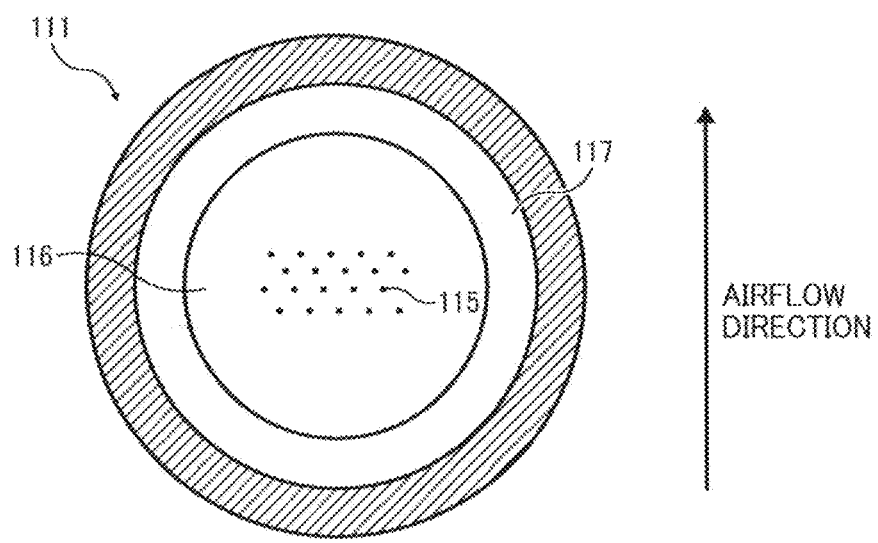
FIG. 15 is a bottom view of the main part of the device illustrated in FIG. 14.
Figure 16:
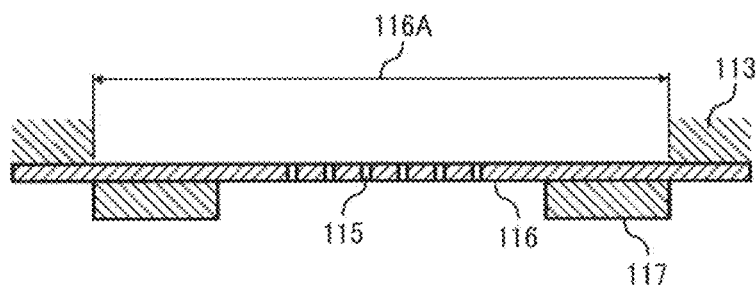
FIG. 16 is a cross-sectional view of a liquid droplet formation unit according to an embodiment.

A film-vibration-type liquid droplet discharge device is described below with reference to drawings disclosed in JP-2008-292976-A. FIG. 14 is a cross-sectional view of a film-vibration-type liquid droplet discharge device 102. FIG. 15 is a bottom view of the main part of the device illustrated in FIG. 14. FIG. 16 is a cross-sectional view of a liquid droplet formation unit.

A liquid droplet discharge device 102 includes a liquid droplet formation unit 111 and a flow path member 113. The liquid droplet formation unit 111 discharges a toner constituents liquid 110 containing at least a resin and a colorant into liquid droplets. The flow path member 113 is forming a retention part (liquid flow path) 112 for supplying the toner constituents liquid 110 to the liquid droplet formation unit 111.

The liquid droplet formation unit 111 includes a thin film 116 to which multiple nozzles 115 are formed and an electromechanical transducer 117 serving as a circular vibration generator that vibrates the thin film 116. An outermost peripheral part (shaded area in FIG. 15) of the thin film 116 is fixed to the flow path member 113 with solder or a binder resin material insoluble in the toner constituents liquid. The electromechanical transducer 117 is disposed on the periphery of a deformable region 116A (a region not fixed to the flow path member 113) of the thin film 116. Upon application of a drive voltage (drive signal) having a required frequency to the electromechanical transducer 117 from a drive circuit (drive signal generation source) through lead wires 121 and 122, for example, flexural vibration is generated.

The thin film 116 is not limited in material. The nozzle 115 is not limited in shape. For example, when the thin film 116 is formed of a metallic plate having a thickness of from 5 to 500 μm and the outlet diameter of the nozzle 115 is from 3 to 35 μm, the toner constituents liquid discharged from the nozzle 115 is formed into fine liquid droplets having an extremely uniform particle diameter, which is preferable. When the outlet of the nozzles 115 has a true circle shape, the diameter of the true circle is employed as the outlet diameter of the nozzle 115. When the outlet has an ellipsoidal shape, the short diameter of the ellipse is employed as the outlet diameter of the nozzle 115. In some embodiments, a preferred number of the multiple nozzles 115 is from 2 to 3,000.

The electromechanical transducer 117 is not limited to a particular device so long as the thin film 116 is reliably applied with vibration at a constant frequency. For example, a piezoelectric body that excites bimorph flexural vibration can be used. The piezoelectric body may be, for example, a piezoelectric ceramic such as lead zirconate titanate (PZT), which is generally laminated because of having a small displacement. Additionally, piezoelectric polymers such as polyvinylidene fluoride (PVDF), crystals, and single crystals of $LiNbO_3$, $LiTaO_3$, and $KNbO_3$ are also usable.

To the flow path member 113, at least one liquid supply tube 118 to supply the toner constituents liquid to the retention part 112 and at least one bubble discharge tube 119 to discharge bubbles are connected. The liquid droplet discharge device 102 is installed on an upper surface of a particle formation part by a support member 120.

A liquid-column-resonance-type liquid droplet discharge device is described below.

FIG. 1 is a schematic view of a liquid column resonance liquid droplet discharge device 11. The liquid column resonance liquid droplet discharge device 11 has a liquid common supply path 17 and a liquid column resonance liquid chamber 18. The liquid column resonance liquid chamber 18 is communicated with the liquid common supply path 17 disposed on its one end wall surface in a longitudinal direction. The liquid column resonance liquid chamber 18 has nozzles 19 to discharge liquid droplets 21, on its one wall surface which is connected with its both longitudinal end wall surfaces. The liquid column resonance liquid chamber 18 also has a vibration generator 20 to generate high-frequency vibration for forming a liquid column resonant standing wave, on the wall surface facing the nozzles 19. The vibration generator 20 is connected to a high-frequency power source.

Figure 2:
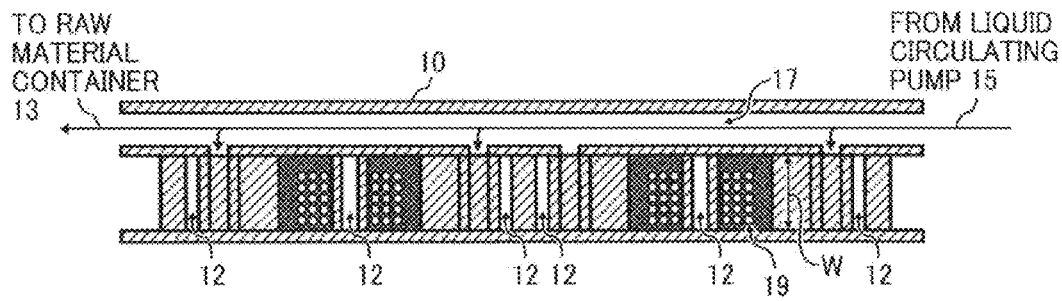
FIG. 2 is a schematic view of a liquid column resonance liquid droplet formation unit according to an embodiment.

A liquid to be discharged from the liquid droplet discharge device is comprised of a solvent in which constituents of the desired fine particles are dissolved or dispersed (hereinafter "a fine particle constituents containing liquid"). Alternatively, the liquid needs not necessarily include a solvent so long as it is in a liquid state under the condition of discharge, and may be comprised of constituents of the fine particles in a melted state (hereinafter "a fine particle constituents melt"). In describing a case in which the desired fine particles is a toner, the liquid is referred to as "toner constituents liquid". A toner constituents liquid 14 is flowed into the liquid common supply path 17 disposed within a liquid droplet formation unit 10, as illustrated in FIG. 2, through a liquid supply tube by a liquid circulating pump and is supplied to each liquid column resonance liquid chamber 18 disposed within the liquid column resonance liquid droplet discharge device 11. Within the liquid column resonance liquid chamber 18 filled with the toner constituents liquid 14, the vibration generator 20 causes liquid column resonance and generates a pressure standing wave. Thus, a pressure distribution is formed therein. The liquid droplets 21 are discharged from the nozzles 19 provided within an area corresponding to an antinode of the pressure standing wave, where the amplitude in pressure variation is large. The area corresponding to an antinode is defined as an area not corresponding to a node of the pressure standing wave. Preferably, the area corresponding to an antinode is an area where the amplitude in pressure variation of the standing wave is large enough to discharge liquid droplets. More preferably, the area corresponding to an antinode is an area extending from a position at a local maximum amplitude (i.e., a node of the velocity standing wave) toward a position at a local minimum amplitude for a distance ±¼ of the wavelength of the pressure standing wave. Within the area corresponding to an antinode of the pressure standing wave, even in a case in which multiple nozzles are provided, each of the multiple nozzles discharges uniform liquid droplets at a high degree of efficiency without causing nozzle clogging. After passing the liquid common supply path 17, the toner constituents liquid 14 flows into a liquid return pipe and returns to a raw material container. As the liquid droplets 21 are discharged, the amount of the toner constituents liquid 14 in the liquid column resonance liquid chamber 18 is reduced and suction force generated by the action of the liquid column resonance standing wave is also reduced within the liquid column resonance liquid chamber 18. Thus, the liquid common supply path 17 temporarily increases the flow rate of the toner constituents liquid 14 to fill the liquid column resonance liquid chamber 18 with the toner constituents liquid 14. After the liquid column resonance liquid chamber 18 is refilled with the toner constituents liquid 14, the flow rate of the toner constituents liquid 14 in the liquid common supply path 17 is returned.

The liquid column resonance liquid chamber 18 may be formed of joined frames formed of a material having a high stiffness which does not adversely affect liquid resonant frequency of the liquid at drive frequency, such as metals, ceramics, and silicone. A length L between both longitudinal ends of the liquid column resonance liquid chamber 18 illustrated in FIG. 1 is determined based on a mechanism of liquid column resonance to be described in detail later. A width W of the liquid column resonance liquid chamber 18 illustrated in FIG. 2 may be smaller than a half of the length L of the liquid column resonance liquid chamber 18 so as not to give excessive frequency to the liquid column resonance. Preferably, a single liquid droplet formation unit 10 includes multiple liquid column resonance liquid chambers 18 to drastically improve manufacturability. The number of the liquid column resonance liquid chambers 18 in one liquid droplet formation unit 10 is not limited to a particular number, but when the number is from 100 to 2,000, operability and manufacturability go together, which is preferable. Each of the liquid column resonance liquid chambers 18 is communicated with the liquid common supply path 17 through each liquid supply path. The liquid common supply path 17 is communicated with multiple liquid column resonance liquid chambers 18.

The vibration generator 20 is not limited to a particular device so long as it can be driven at a predetermined frequency. For example, the vibration generator 20 may be formed from a piezoelectric body and an elastic plate 9 attached to each other. The elastic plate 9 constitutes a part of the wall of the liquid column resonance liquid chamber 18 so that the piezoelectric body does not contact the liquid. The piezoelectric body may be, for example, a piezoelectric ceramic such as lead zirconate titanate (PZT), which is generally laminated because of having a small displacement. Additionally, piezoelectric polymers such as polyvinylidene fluoride (PVDF), crystals, and single crystals of $LiNbO_3$, $LiTaO_3$, and $KNbO_3$ are also usable. Preferably, the vibration generator 20 in each liquid column resonance liquid chamber 18 is independently controllable. Alternatively, a single blockish vibrating material may be partially cut to fit the arrangement of the liquid column resonance liquid chambers 18 so that each liquid column resonance liquid chamber 18 is independently controllable through the elastic plate.

Each of the nozzles 19 preferably has an outlet diameter of from 1 to 40 μm. When the outlet diameter is 1 μm or more, the formation of excessively small liquid droplets is prevented and the resulting liquid droplets have a proper size. Moreover, even in a case in which the liquid includes solid fine particles of toner constituents, such as pigments, the nozzles 19 are not clogged and the productivity is increased. When the outlet diameter is less than 40 μm, the formation of excessively large liquid droplets is prevented. Thus, toner particles having a particle diameter of from 3 to 6 μm can be obtained by drying and solidifying the liquid droplets without diluting the toner constituents liquid. There are some cases in which the toner constituents liquid needs to be diluted with an organic solvent. Even in such cases, the amount of the organic solvent used for the dilution can be reduced and therefore the amount of energy consumed in drying liquid droplets can be reduced. Arranging the nozzles 19 in the width direction of the liquid column resonance liquid chamber 18, as illustrated in FIG. 2, is preferable because it is possible to arrange a large number of the nozzles 19 and to improve production efficiency. The liquid column resonant frequency varies depending on the arrangement of the nozzles 19. Thus, the liquid column resonant frequency may be varied in accordance with the nozzle arrangement and corresponding liquid droplets discharge condition.

The cross-sectional shape of the nozzles 19 has a tapered shape such that the outlet diameter gets relatively small, but is not limited thereto.

FIGS. 3A to 3D are cross-sectional views of the nozzles 19 in accordance with some embodiments. In an embodiment illustrated in FIG. 3A, a thin film 41 has a half-rounded cross-sectional shape such that the opening diameter of each of the nozzles 19 is gradually reduced from the liquid-contacting surface toward the outlet. In this embodiment, the liquid is applied with the maximum pressure at vicinities of the outlets of the nozzles 19 during vibration of the thin film 41, which is most preferable in terms of stabilization of discharge.

Figure 3A:
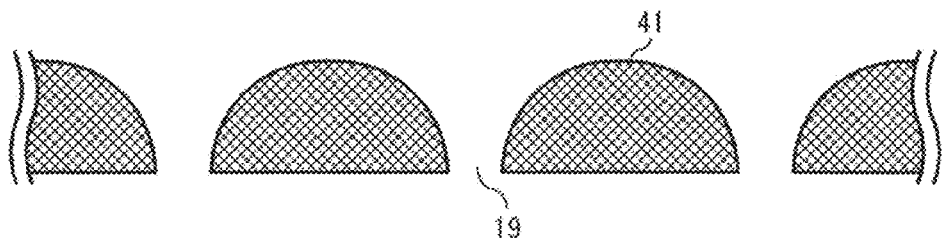
FIGS. 3A to 3D are cross-sectional views of nozzles in accordance with some embodiments.
Figure 3B:
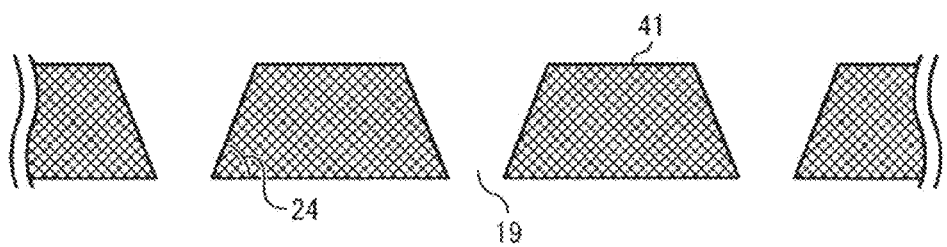
Figure 3C:
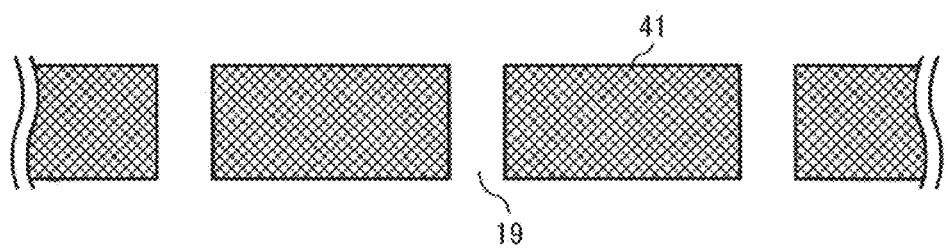

In an embodiment illustrated in FIG. 3B, the thin film 41 has a cross-sectional shape such that the opening diameter of each of the nozzles 19 is reduced from the liquid-contacting surface toward the outlet at a constant rate forming a predetermined nozzle angle 24. The nozzle angle 24 is variable. Same as the embodiment illustrated in FIG. 3A, the liquid is applied with the maximum pressure at vicinities of the outlets of the nozzles 19 during vibration of the thin film 41. Preferably, the nozzle angle 24 is from 60° to 90°. When the nozzle angle 24 is 60° or more, the liquid can be sufficiently applied with pressure and also it is easy to process the thin film 41 accordingly. In a case in which the nozzle angle 24 is 90° is illustrated in FIG. 3C. The maximum value for the nozzle angle 24 is preferably 90° because it may be difficult to apply pressure to the vicinities of the outlets of the nozzles 19 when the nozzle angle 24 exceeds 90°.

Figure 3D:
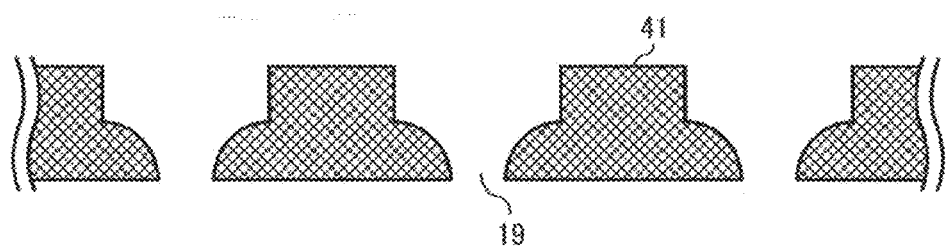

An embodiment illustrated in FIG. 3D is a combination of the embodiments illustrated in FIGS. 3A and 3C. As illustrated in FIG. 3D, the cross-sectional shape of the thin film 41 may be varied in a stepwise manner.

A mechanism of liquid droplet formation in the liquid droplet formation unit is described in detail below.

First, a mechanism of liquid column resonance phenomenon generated in the liquid column resonance liquid chamber 18 within the liquid column resonance liquid droplet discharge device 11 illustrated in FIG. 1 is described below. The resonant wavelength $\lambda$ is represented by the following formula (1):

$$\lambda = c/f \tag{1}$$

wherein c represents a sonic speed in the toner constituents liquid in the liquid column resonance liquid chamber 18 and f represents a drive frequency given to the toner constituents liquid from the vibration generator 20.

Referring to FIG. 1, L represents a length between the fixed end of the frame of the liquid column resonance liquid chamber 18 and the other end thereof closer to the liquid common supply path 17; h1 (e.g., about 80 μm) represents a height of the end of the frame of the liquid column resonance liquid chamber 18 closer to the liquid common supply path 17; and h2 (e.g., about 40 μm) represents a height of a communication opening between the liquid column resonance liquid chamber 18 and the liquid common supply path 17. The height h1 is about twice as much as the height h2. When both ends are fixed, resonance most effectively occurs when the length L is an even multiple of $\lambda/4$. In this case, the length L is represented by the following formula (2):

$$L = (N/4)\lambda \tag{2}$$

wherein N represents an even number.

The formula (2) is also satisfied when both ends of the liquid column resonance liquid chamber 18 are completely open or free.

Similarly, when one end is open or free so that pressure can be released and the other end is closed or fixed, resonance most effectively occurs when the length L is an odd multiple of $\lambda/4$. In this case, the length L is represented by the formula (2) as well, wherein N represents an odd number.

Thus, the most effective drive frequency f is derived from the formulae (1) and (2) and represented by the following formula (3):

$$f = N \times c/(4L) \tag{3}$$

Actually, vibration is not infinitely amplified because the liquid attenuates resonance due to its viscosity. Therefore, resonance can occur even at a frequency around the most effective drive frequency f represented by the formula (3), as shown in the later-described formula (4) or (5).

Figure 4A:
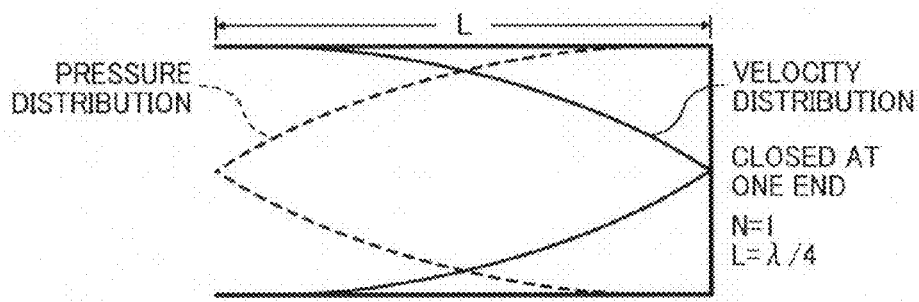
FIGS. 4A to 4D are views of wave configurations (i.e., resonant modes) of velocity and pressure standing waves when N is 1, 2, or 3.
Figure 4B:
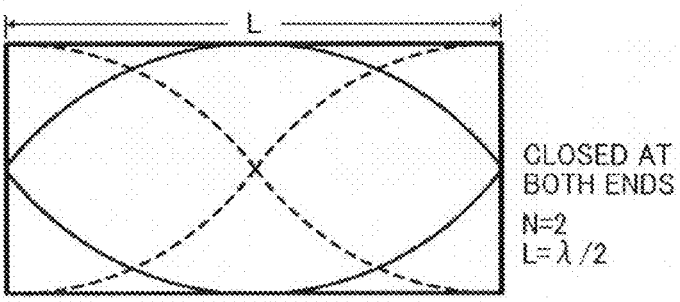
Figure 4C:
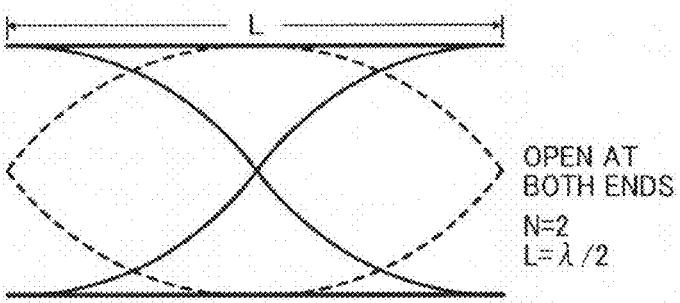
Figure 4D:
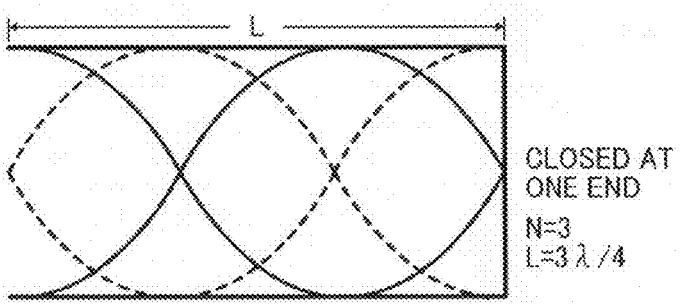
Figure 5A:
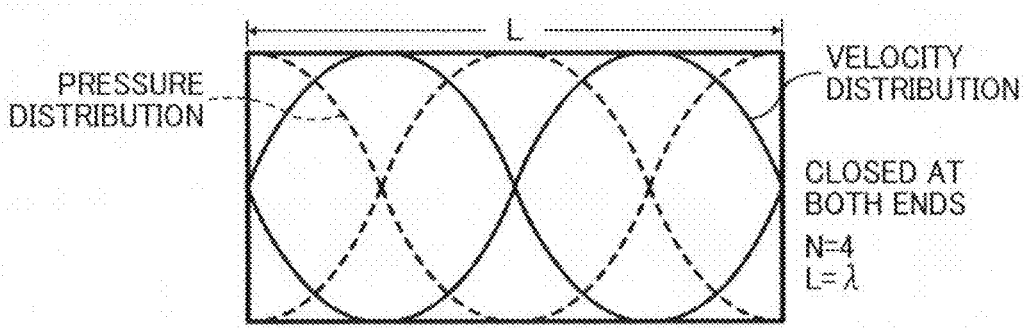
FIGS. 5A to 5C are views of wave configurations (i.e., resonant modes) of velocity and pressure standing waves when N is 4 or 5.
Figure 5B:
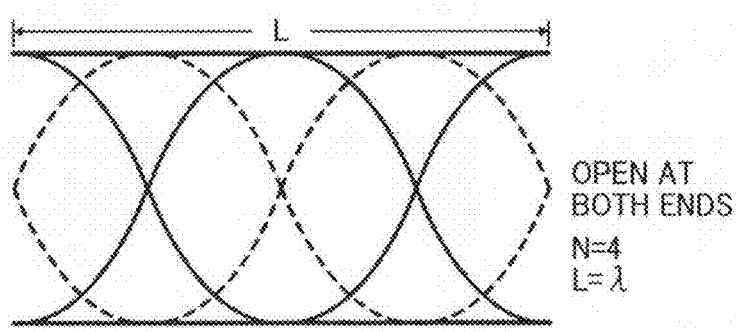
Figure 5C:
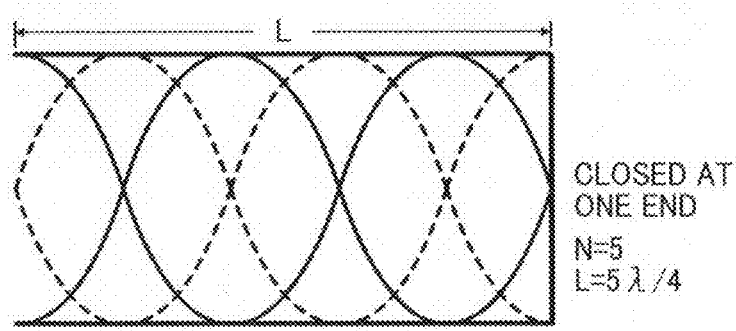

FIGS. 4A to 4D are views of wave configurations (i.e., resonant modes) of velocity and pressure standing waves when N is 1, 2, or 3. FIGS. 5A to 5C are views of wave configurations (i.e., resonant modes) of velocity and pressure standing waves when N is 4 or 5. The standing waves are longitudinal waves in actual but are generally illustrated as transversal waves in FIGS. 4A to 4D and FIGS. 5A to 5C. In FIGS. 4A to 4D and FIGS. 5A to 5C, solid lines represent velocity standing waves and dotted lines represent pressure standing waves. For example, referring to FIG. 4A, it is intuitively understandable that when one end is closed and N is 1, amplitude of the velocity standing wave is zero at the closed end and is maximum at the open end. When L represents the length between both longitudinal ends of the liquid column resonance liquid chamber 18 and $\lambda$ represents the liquid column resonant wavelength of the toner constituents liquid, standing waves most effectively occur when the integer N is 1 to 5. Wave configurations of the standing waves depend on whether or not either end is open or closed. The condition of either end depends on conditions of nozzles and/or supply openings. In acoustics, an open end is defined as a point at which longitudinal velocity of a medium (e.g., a liquid) is maximum and pressure thereof is zero. A closed end is defined as a point at which longitudinal velocity of the medium is zero. The closed end is acoustically considered as a hard wall that reflects waves. When each end is ideally completely closed or open, resonant standing waves as illustrated in FIGS. 4A to 4D and FIGS. 5A to 5C occur. Configurations of the standing waves vary depending on the number and/or arrangement of the nozzles. Thus, resonant frequency can appear even at a position displaced from the position derived from the formula (3). Even in such cases, stable discharge conditions can be provided by adjusting the drive frequency. For example, when the sonic speed c in the liquid is 1,200 m/s, the length L between both ends of the liquid column resonance liquid chamber 18 is 1.85 mm, both ends are fixed with wall surfaces, i.e., both ends are closed, and N is 2, the most effective resonant frequency is derived from the formula (3) as 324 kHz. As another example, when the sonic speed c in the liquid is 1,200 m/s, the length L between both ends of the liquid column resonance liquid chamber 18 is 1.85 mm, both ends are fixed with wall surfaces, i.e., both ends are closed, and N is 4, the most effective resonant frequency is derived from the formula (3) as 648 kHz. Thus, higher resonance can occur in the single liquid column resonance liquid chamber 18.

In the liquid column resonance liquid chamber 18 of the liquid column resonance liquid droplet discharge device 11 illustrated in FIG. 1, preferably, both ends are equivalent to closed ends or are regarded as being acoustically soft walls due to the influence of the nozzle openings, to increase the frequency. Of course, both ends may be equivalent to open ends. The influence of the nozzle openings means a lesser acoustic impedance and a greater compliance component. When the liquid column resonance liquid chamber 18 has wall surfaces on both longitudinal ends, as illustrated in FIG. 4B or FIG. 5A, all possible resonant modes are available as if both ends are closed or one end is open, which is preferable.

In particular, the drive frequency depends on the number, arrangement, and/or cross-sectional shape of the nozzles 19. For example, as the number of the nozzles 19 increases, closed ends of the liquid column resonance liquid chamber 18 are gradually released from restriction. As a result, a resonant standing wave is generated as if both ends are substantially open and the drive frequency is increased. The restriction releases from the position of one of the nozzles 19 disposed closest to a liquid supply path 17. As another example, when each of the nozzles 19 has a round cross-sectional shape or the volume of each nozzle 19 is varied by varying the frame thickness, the actual standing wave has a short wavelength which has a higher frequency than the drive frequency. Upon application of voltage to the vibration generator 20 with the drive frequency thus determined, the vibration generator 20 deforms so as to generate a resonant standing wave most effectively. A liquid column resonance standing wave can generate even at a frequency around the most effective drive frequency for generating a resonant standing wave. When the vibration generator 20 vibrates at a drive frequency f satisfying the following formulae (4) and (5), a liquid column resonance is generated and liquid droplets are discharged from the nozzles 19: wherein L represents a length between both longitudinal ends of the liquid column resonance liquid chamber 18 and Le represents a distance between a longitudinal end of the liquid column resonance liquid chamber 18 closer to the liquid common supply path 17 and the nozzle 19 closest to the longitudinal end.

$$N \times c/(4L) \leq f \leq N \times c/(4Le) \quad (4)$$

$$N \times c/(4L) \leq f \leq (N+1) \times c/(4Le) \quad (5)$$

In some embodiments, it is preferred that an inequation Le/L>0.6 is satisfied.

Based on the above-described mechanism of liquid column resonance, a liquid column resonant pressure standing wave is formed in the liquid column resonance liquid chamber 18 illustrated in FIG. 1 and liquid droplets are continuously discharged from the nozzles 19 disposed to a part of the liquid column resonance liquid chamber 18. When the nozzles 19 are disposed at a position of the maximum amplitude of the pressure standing wave, discharge efficiency becomes maximum and low-voltage driving is allowed, which is preferable. A single liquid column resonance liquid chamber 18 includes multiple nozzles 19 to improve manufacturability. Preferably, the number of the nozzles 19 is from 2 to 100.

When the number of the nozzles 19 per liquid column resonance liquid chamber 18 is 100 or less, a voltage to be applied to the vibration generator 20 in forming liquid droplets from the nozzles 19 can be reduced and therefore the behavior of the piezoelectric body serving as the vibration generator 20 can be stabilized. Preferably, the interval between adjacent nozzles 19 is 20 µm or more, and equal to or less than the length of the liquid column resonance liquid chamber 18. When the interval is 20 µm or more, probability that liquid droplets discharged from adjacent nozzles collide with each other and form a large liquid droplet can be reduced, resulting in production of toner particles having a proper particle size distribution.

Details of liquid column resonance phenomenon occurring in the liquid column resonance liquid chamber 18 are described with reference to FIGS. 6A to 6D. In FIGS. 6A to 6D, solid lines represent velocity distributions at arbitrary points within the liquid column resonance liquid chamber 18. With respect to velocity, the direction from the liquid common supply path 17 side toward the liquid column resonance liquid chamber 18 is defined as the plus (+) direction and the opposite direction is defined as the minus (−) direction. Dotted lines represent pressure distributions at arbitrary points within the liquid column resonance liquid chamber 18. A positive (+) pressure and a negative (−) pressure relative to atmospheric pressure respectively create downward and upward pressures in FIGS. 6A to 6D. In FIGS. 6A to 6D, the height (equivalent to h1 in FIG. 1) of the end of the frame of the liquid column resonance liquid chamber 18 closer to the liquid common supply path 17 is more than twice as the height (equivalent to h2 in FIG. 1) of the communication opening between the liquid column resonance liquid chamber 18 and the liquid common supply path 17. Therefore, it can be assumed that both ends of the liquid column resonance liquid chamber 18 are approximately closed.

Figure 6A:
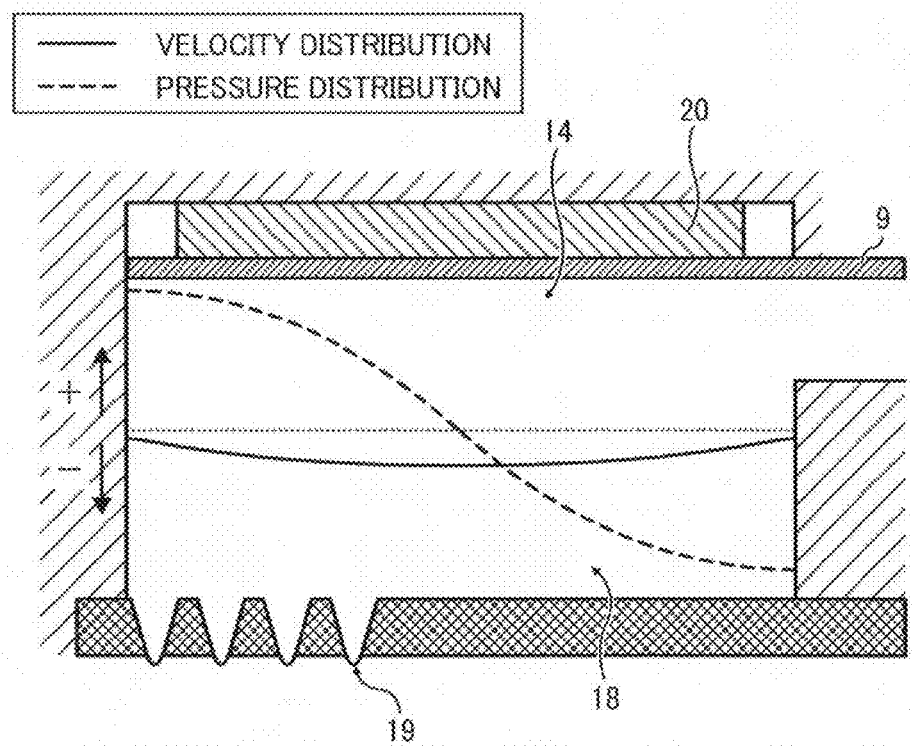
FIGS. 6A to 6D are views for explaining liquid column resonance phenomenon occurring in a liquid column resonance liquid chamber according to an embodiment.
Figure 6B:
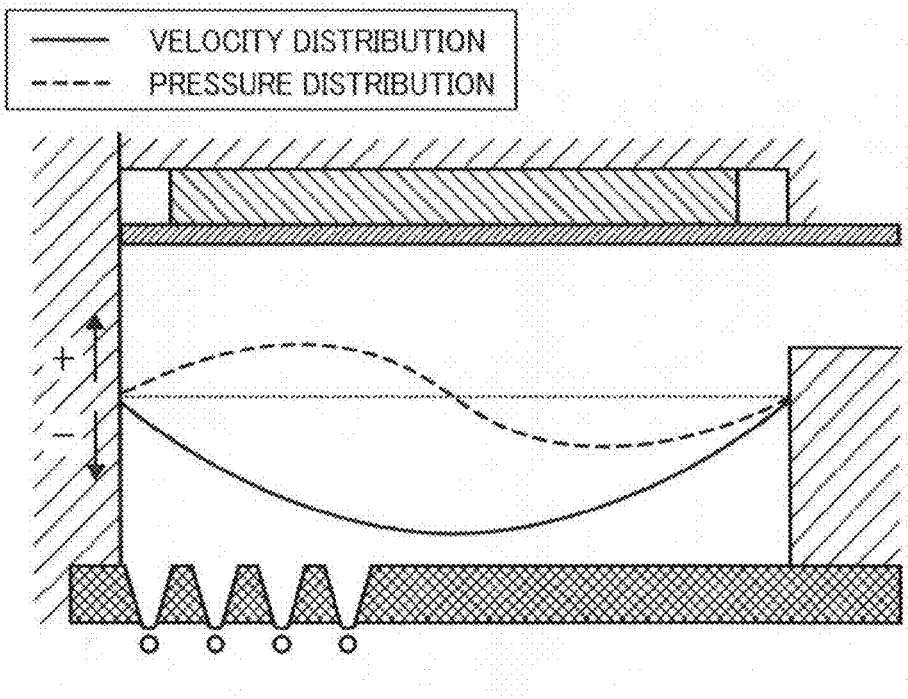

In FIG. 6A, pressure and velocity wave configurations within the liquid column resonance liquid chamber 18 are illustrated at the time liquid droplets are being discharged. In FIG. 6A, the pressure within the liquid column resonance liquid chamber 18 becomes maximal at the position where the nozzles 19 are disposed. Thereafter, as illustrated in FIG. 6B, the positive pressure around the nozzles 19 decreases toward negative pressures so as to start discharging liquid droplets 21.

Figure 6C:
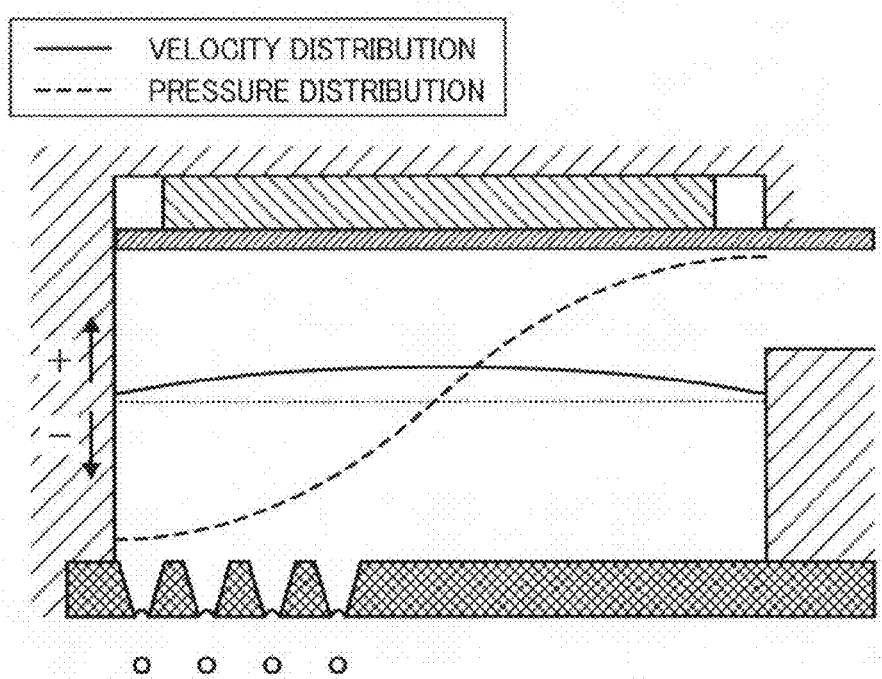
Figure 6D:
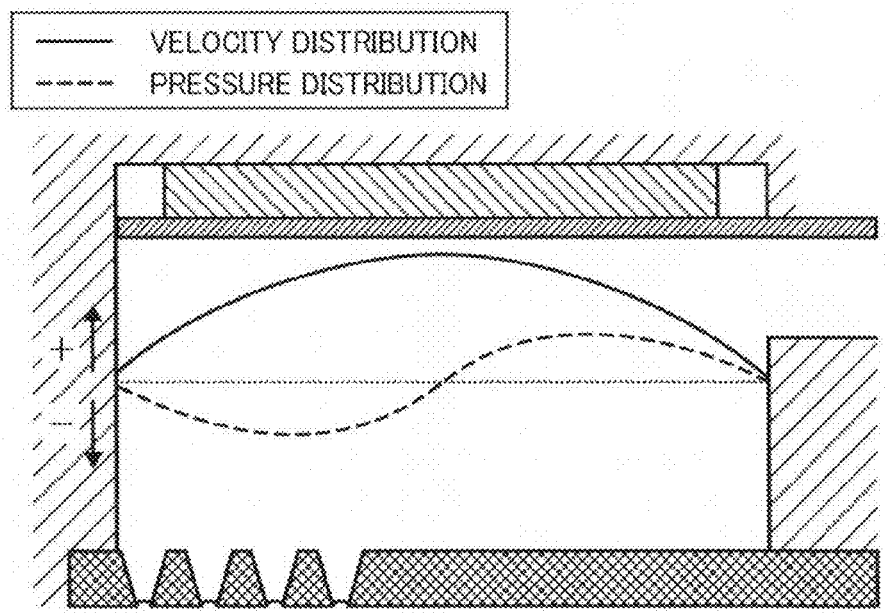

Thereafter, as illustrated in FIG. 6C, the pressure around the nozzles 19 becomes minimal. From this time, filling of the liquid column resonance liquid chamber 18 with the toner constituents liquid 14 is started. Thereafter, as illustrated in FIG. 6D, the negative pressure around the nozzles 19 increases in a direction toward positive pressures. At this time, filling of the liquid column resonance liquid chamber 18 with the toner constituents liquid 14 is terminated. Thereafter, as illustrated in FIG. 6A, the pressure within the liquid column resonance liquid chamber 18 becomes maximal again at the position where the nozzles 19 are disposed so as to start discharging liquid droplets 21 again. In summary, a standing wave is generated in liquid column resonance caused by a high-frequency driving of the generation vibrator 20 within the liquid column resonance liquid chamber 18. The nozzles 19 are disposed to the position corresponding to antinodes of the standing wave at which the pressure amplitude becomes maximum so that the liquid droplets 21 are continuously discharged from the nozzles 19 in accordance with the period of the antinodes.

Figure 7:
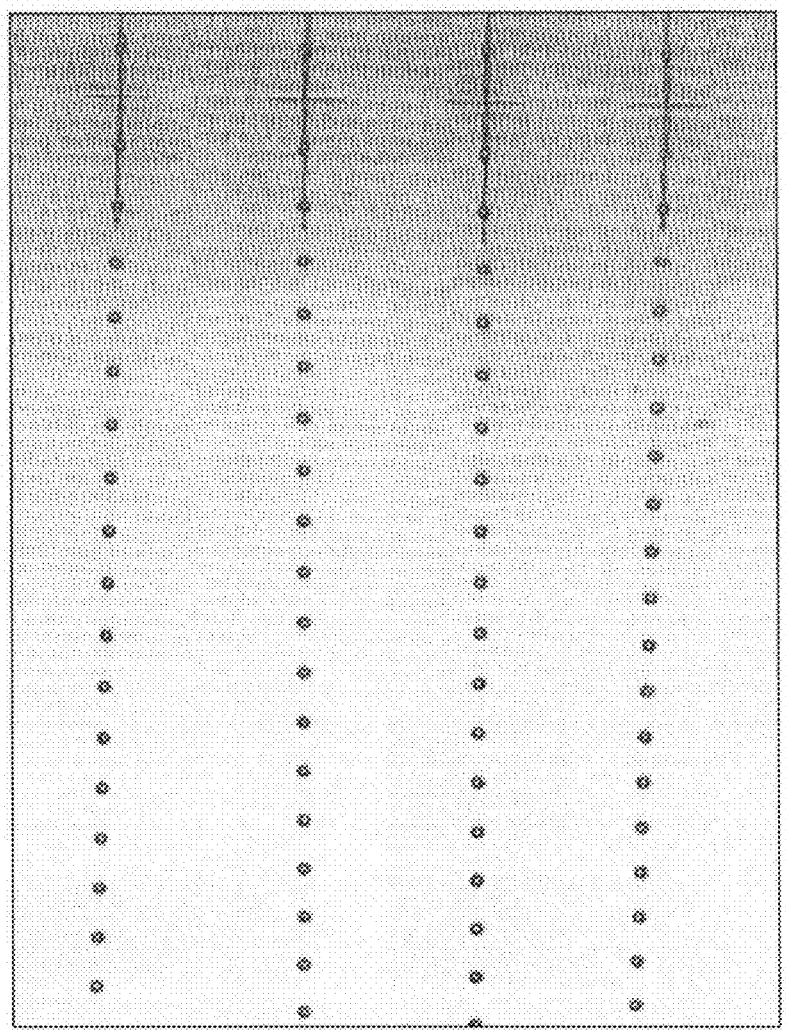
FIG. 7 is a photograph showing liquid droplet discharge phenomenon according to an embodiment obtained by laser shadowgraphy.

In one embodiment, the length L between both longitudinal ends of the liquid column resonance liquid chamber 18 is 1.85 mm and the resonant mode N is 2. The first to fourth nozzles are disposed within an area corresponding to an antinode of the pressure standing wave, and the drive wave is a sine wave having a drive frequency of 340 kHz. FIG. 7 is a photograph showing liquid droplet discharge phenomenon according to this embodiment obtained by laser shadowgraphy. It is clear from FIG. 7 that the discharged liquid droplets are very uniform in both particle size and discharge velocity.

Figure 8:
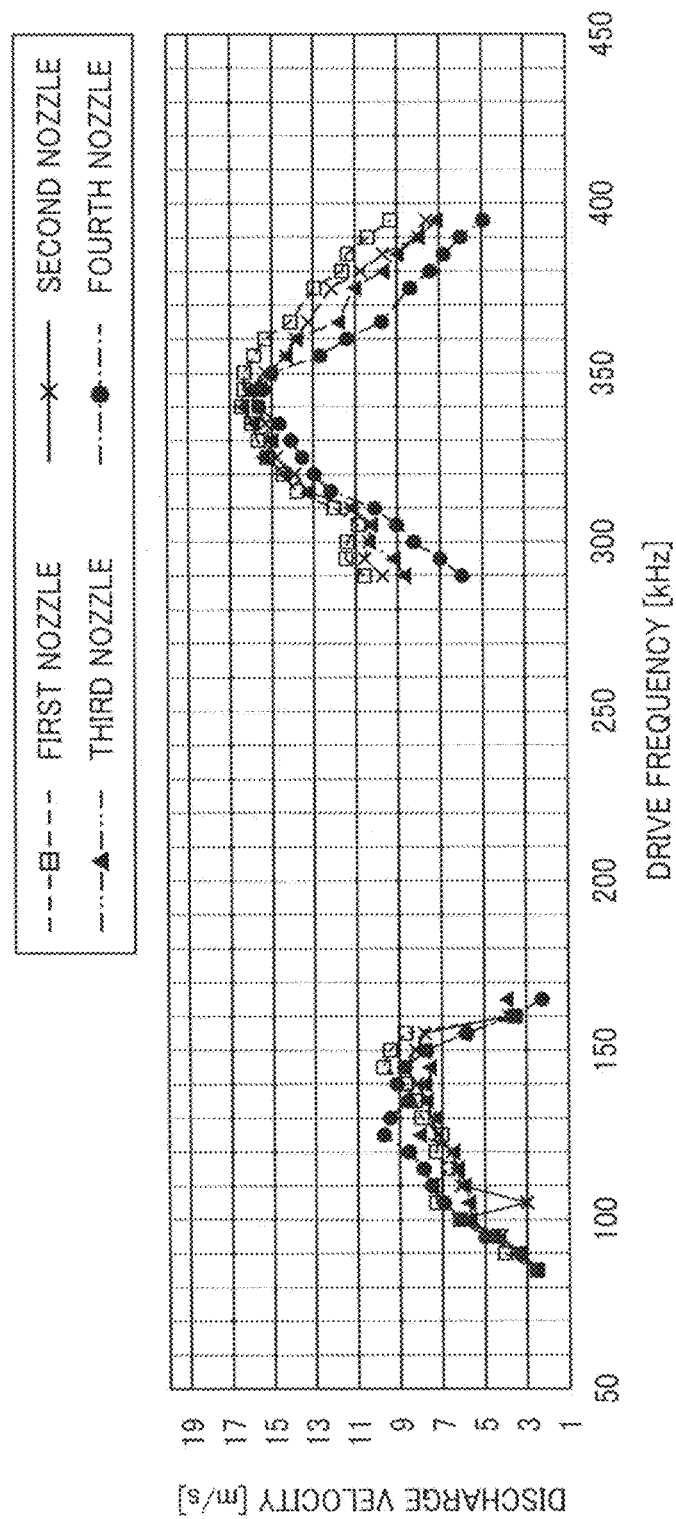
FIG. 8 is a graph showing relations between drive frequency and discharge velocity when the drive wave is sine waves having a driving frequency between 290 and 395 kHz with the same amplitude.

FIG. 8 is a graph showing relations between drive frequency and discharge velocity when the drive wave is sine waves having a driving frequency between 290 and 395 kHz with the same amplitude. It is clear from FIG. 8 that the discharge velocities at all the first to fourth nozzles become maximal and uniform when the drive frequency is around 340 kHz. Accordingly, it is clear that the liquid droplet discharge phenomenon occurs at the position corresponding to antinodes of the standing wave having a frequency of 340 kHz that is the second resonant mode of liquid column resonance. It is also clear from FIG. 8 that liquid droplet discharge phenomenon does not occur between the first resonant mode around drive frequencies of 130 kHz and the second resonant mode around drive frequencies of 340 kHz, at each of which the discharge velocity becomes local maximum.

Figure 9A:
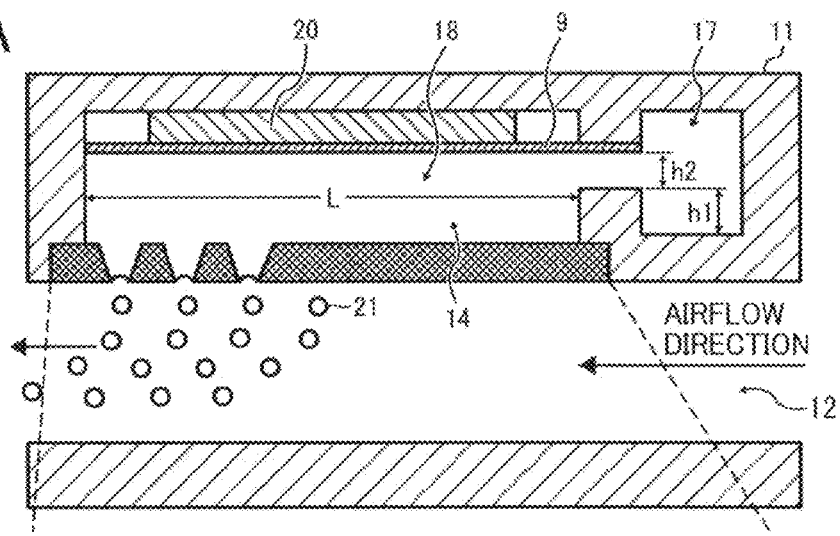
FIGS. 9A to 9C are schematic views illustrating a liquid column resonance liquid droplet discharge device and its nozzle arrangements.
Figure 9B:
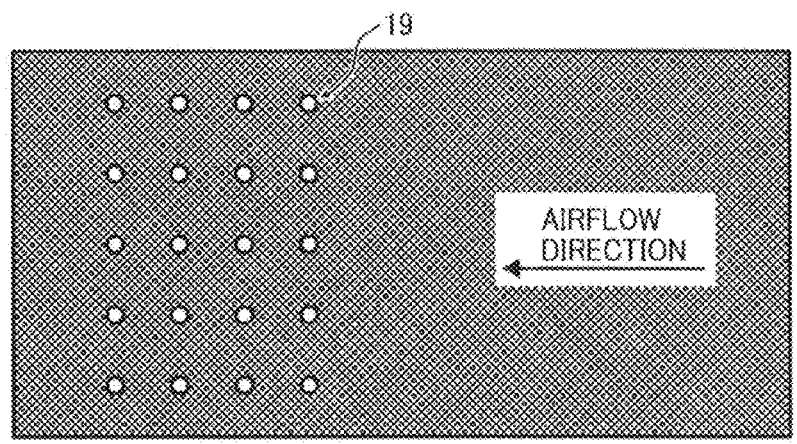
Figure 9C:
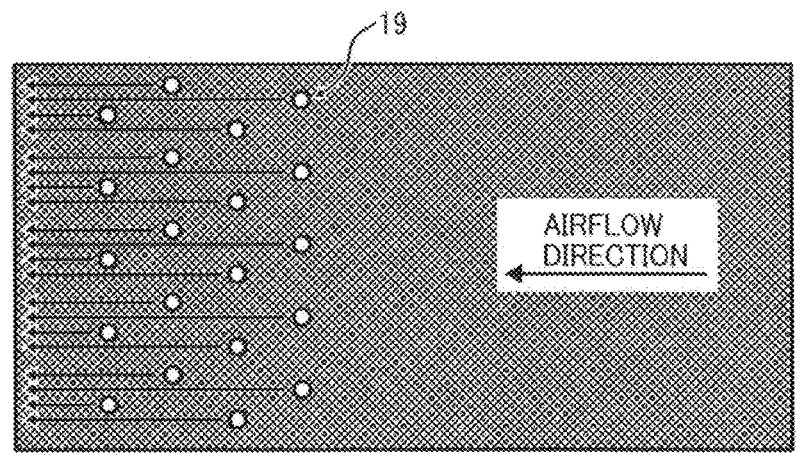

The arrangement of nozzles 19 is described below with reference to FIGS. 9A to 9C. When multiple nozzles 19 are arranged in a manner such that each of the nozzles overlaps each other relative to the direction of feed of airflow, as illustrated in FIG. 9B, discharged liquid droplets containing fine particle constituents are likely to intersect and coalesce with each other before reaching an area in which they are dried and solidified, which is undesirable. According to an embodiment, as illustrated in FIG. 9C, multiple nozzles 19 are arranged in a manner such that each of the nozzles does not overlap each other relative to the direction of feed of airflow.

Preferably, an inequation $V_0 \geq 2d_0 \times f$, or more preferably an inequation $V_0 \geq 3d_0 \times f$ is satisfied, wherein $V_0$ represents a discharge velocity of liquid droplets, $d_0$ represents a diameter of the liquid droplets, and f represents a drive frequency. In such embodiments, liquid droplets are prevented from coalescing with each other and particles having a proper particle size distribution are obtained. When $V_0$ is less than $2d_0 \times f$, the distance from an anterior liquid droplet to a posterior liquid droplet is so small that they are likely to coalesce with each other. The diameter and discharge velocity of the liquid droplets are controllable by controlling the diameter of the nozzles, drive frequency f, and applied voltage.

After the liquid droplet discharge device discharges liquid droplets of the toner constituents liquid into a gas phase, the liquid droplets are solidified and collected.

Method for solidifying the liquid droplets is not limited to a specific method so long as the toner constituents liquid can be solidified.

For example, when the toner constituents liquid is comprised of a volatile solvent in which solid raw materials are dissolved or dispersed, the liquid droplets can be solidified by drying the liquid droplets, in other words, evaporating the solvent. The drying condition is controllable by controlling the temperature of the injection gas, vapor pressure, and kind of the gas. The liquid droplets need not necessarily be completely dried so long as the collected particles are kept in a solid state. In this case, the collected particles may be subject to an additional drying process. Alternatively, the drying can be achieved by means of temperature change, chemical reaction, etc.

The solidified particles may be collected by, for example, a cyclone collector or a back filter.

Figure 10:
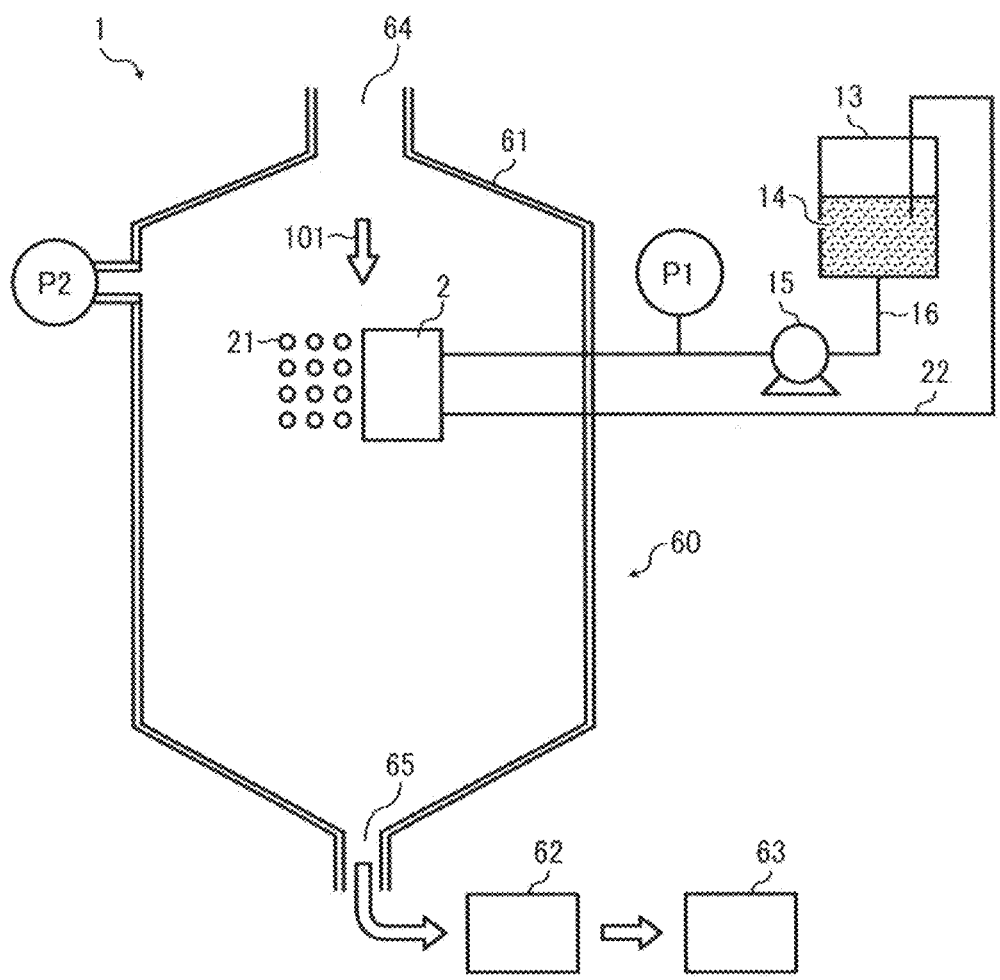
FIG. 10 is a schematic view of a toner manufacturing apparatus according to an embodiment.

FIG. 10 is a schematic view of a toner manufacturing apparatus according to an embodiment. A toner manufacturing apparatus 1 has a liquid droplet discharge unit 2 and a drying collecting unit 60.

The liquid droplet discharge unit 2 has a raw material container 13 to contain the toner constituents liquid 14; and a liquid circulating pump 15 to pump the toner constituents liquid 14 in a liquid supply pipe 16 to supply the toner constituents liquid 14 in the raw material container 13 to the liquid droplet discharge unit 2 through the liquid supply path 16 and to return it to the raw material container 13 through a liquid return pipe 22. Thus, the toner constituents liquid 14 can be constantly supplied to the liquid droplet discharge unit 2. The liquid supply pipe 16 and the drying collecting unit 60 are equipped with pressure gauges P1 and P2, respectively. The pressure gauges P1 and P2 monitor the liquid feed pressure toward the liquid droplet discharge unit 2 and the inner pressure of the drying collecting unit 60, respectively. When P1>P2, there is a concern that the toner constituents liquid leaks from the nozzles. When P1<P2, the liquid droplet discharge phenomenon may be stopped due to immersion of a gas to the liquid droplet discharge unit 2. Thus, preferably, P1 nearly equals P2.

Within a chamber 61, a descending airflow 101 is formed from an airflow inlet 64. The liquid droplets 21 discharged from the liquid droplet discharge unit 2 are conveyed downward by the action of gravity as well as the airflow 101 and collected by a solidified particle collection device 62.

If the injected liquid droplets are brought into contact with each other before being dried, the liquid droplets coalesce with each other to form a single particle. (This phenomenon is hereinafter referred to as "coalescence".) To obtain the solidified particles having a uniform particle diameter distribution, it is preferable that the distance between the injected liquid droplets is kept constant. Although the initial velocity is constant, the injected liquid droplet is gradually stalled due to air resistance. As a result, a posterior liquid droplet may catch up on and coalesce with the stalled particle. Because this phenomenon occurs constantly, the particle diameter distribution the resulting collected particles may be undesirably wide. To prevent the coalescence of liquid droplets, liquid droplets are conveyed to the solidified particle collection device 62 by the airflow 101 while being solidified without being stalled or brought into contact with each other.

The direction of the airflow 101 that conveys the liquid droplets is preferably perpendicular to the direction of discharge, as illustrated in FIG. 1. The airflow 101 may be formed of, for example, the air or a noncombustible gas such as nitrogen. The temperature of the airflow 101 is variable but is preferably constant during the manufacturing operation. The chamber 61 may further include a unit for changing the condition of the airflow 101. The airflow 101 may prevent not only the coalescence of the liquid droplets 21 but also the adhesion of the liquid droplets 21 to the chamber 61.

Within an airflow path 12, the airflow 101 forms vortexes having various sizes which are irregularly changeable in terms of time and space. In some cases, the injected liquid droplets coalesce with each other to degrade the particle diameter distribution of the resulting particles due to such a disturbance of the airflow 101 caused by the generation of the vortexes in the airflow path 12. Preferably, to prevent the coalescence of the liquid droplets due to the generation of vortexes, a rectifier 25 to rectify the airflow is provided on a windward side from the nozzles as illustrated in FIG. 1.

The rectifier 25 may be formed of, for example, a honeycomb structural body. But the structure of the rectifier 25 is not limited thereto so long as the airflow is rectified. The honeycomb structural body is a structural body formed by arranging three-dimensional structures without forming any space therebetween, and has an airflow rectifying effect. The three-dimensional structures that form the honeycomb structural body are not limited in shape so long as the honeycomb structural body has an airflow rectifying effect.

Figure 13:
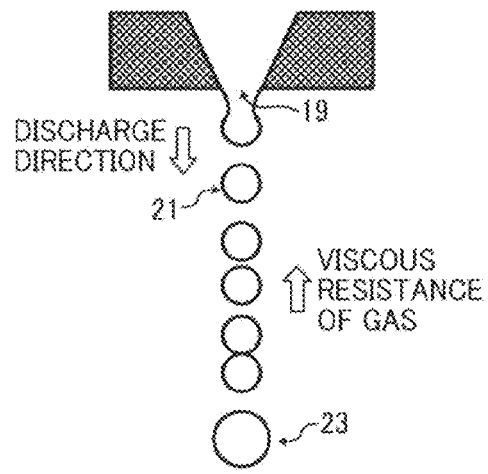
FIG. 13 is a view for explaining a coalescence phenomenon.

Preferably, the velocity of the airflow is 7 m/s or more, and more preferably, 15 m/s or more. In such embodiments, the particle diameter distribution of the resulting fine particles is much more narrowed. When the velocity is less than 7 m/s, when the liquid droplet discharge unit 2 continuously discharge the liquid droplets 21 as illustrated in FIG. 13, a posterior liquid droplet may be stalled due to the viscous resistance of gas and may catch up on an anterior liquid droplet before the anterior liquid droplet is dried. As a result, a coalesced liquid droplet 23 having a large particle diameter is undesirably formed. The coalesced liquid droplet 23 keeps a large particle diameter even after being dried and widens the particle diameter distribution. When the velocity of the airflow is within the above range, the formation of such a coalesced particle due to the viscous resistance of gas can be prevented.

When toner particles collected in the drying collecting unit 60 illustrated in FIG. 10 contain a large amount of residual solvent, the toner particles may be optionally subjected to a secondary drying. The secondary drying may be performed by, for example, a fluidized-bed dryer or a vacuum dryer. If toner particles keep containing residual solvent, toner properties such as heat-resistant storage stability, fixability, and chargeability may deteriorate. Moreover, when such toner particles are fixed on a recording material by application of heat, the solvent volatilizes to adversely affect users and peripheral devices.

A toner manufactured by an apparatus according to an embodiment is described below.

A toner manufactured by an apparatus according to an embodiment includes at least a resin, a colorant, and a wax, and optionally includes other materials such as a charge controlling agent, if needed.

According to an embodiment, the toner constituents liquid is comprised of a solvent in which the above toner constituents are dissolved or dispersed. Alternatively, the toner constituents liquid needs not necessarily include a solvent so long as it is in a liquid state under the condition of discharge, and may be comprised of the toner constituents partially or completely melted into a liquid.

Usable materials include all materials generally used for toner so long as the toner constituents liquid can be prepared. By forming fine liquid droplets of the toner constituents liquid by the liquid droplet discharge device and solidifying the liquid droplets by the drying collecting unit, desired toner particles can be obtained.

Usable resins include at least binder resins.

Specific examples of usable binder resins include, but are not limited to, vinyl homopolymers and copolymers obtainable from styrene monomers, acrylic monomers, and/or methacrylic monomers, polyester polymers, polyol resins, phenol resins, silicone resins, polyurethane resins, polyamide resins, furan resins, epoxy resins, xylene resins, terpene resins, coumarone indene resins, polycarbonate resins, and petroleum resins.

Preferably, the binder resin is soluble in solvent. In addition, the binder resin preferably has known performances which general binder resins have.

Preferably, the binder resin has a molecular weight distribution measured by GPC (gel permeation chromatography) such that at least one peak exists within a molecular weight range from 3,000 to 50,000 in terms of fixability and offset resistance of the toner. Preferably, THF-soluble contents of the binder resin include contents having a molecular weight of 100,000 or less in an amount of 60 to 100%. Preferably, the binder resin has a molecular weight distribution such that at least one peak exists within a molecular weight range from 5,000 to 20,000.

Preferably, the binder resin includes a resin having an acid value of from 0.1 to 50 mgKOH/g in an amount of 60% by weight or more.

Acid value of the binder resin is measured based on a method according to JIS K-0070.

The toner may include a magnetic material. Specific examples of usable magnetic materials include, but are not limited to, (1) magnetic iron oxides (e.g., magnetite, maghemite, ferrite) and iron oxides containing other metal oxides; (2) metals (e.g., iron, cobalt, nickel) and their alloys with aluminum, cobalt, copper, lead, magnesium, tin, zinc, antimony, beryllium, bismuth, cadmium, calcium, manganese, selenium, titanium, tungsten, and vanadium; and (3) mixtures of the above compounds. The magnetic material may be used as a colorant either. The content of the magnetic material is preferably from 10 to 200 parts by weight, more preferably from 20 to 150 parts by weight, based on 100 parts of the binder resin. The number average particle diameter of the magnetic material is preferably from 0.1 to 2 µm, and more preferably from 0.1 to 0.5 µm. The number average particle diameter can be determined by analyzing a transmission electron microscope image of the magnetic material with a digitizer.

The toner may include a colorant.

The content of the colorant in the toner is preferably from 1 to 15% by weight, and more preferably from 3 to 10% by weight.

The colorant can be combined with a resin to be used as a master batch. The master batch is for previously dispersing colorant, and is not necessarily if the colorant is already sufficiently dispersed. The master batch is obtained by mixing a colorant and a resin while applying a high sharing force thereto to disperse the colorant in the resin with a high degree of dispersion. Resins usable for the master batch include all known resins. Two or more resins can be used in combination.

The content of the master batch is preferably from 0.1 to 20 parts by weight based on 100 parts by weight of the binder resin.

When preparing the master batch, a dispersant may be used to improve dispersibility of colorant. Usable dispersants preferably have high affinity for the binder resin in terms of dispersibility. For example, commercially available colorant dispersants such as AJISPER PB821 and PB822 (from Ajinomoto Fine-Techno Co., Inc.), DISPERBYK-2001 (from BYK-Chemie GmbH), and EFKA-4010 (from EFKA) are usable.

The content of the colorant dispersant is preferably from 0.1 to 10% by weight based on the colorant. When the content is 0.1% by weight or more, colorant dispersibility is satisfactory. When the content is 10% by weight or less, deterioration of chargeability under high-humidity conditions is prevented.

The content of the colorant dispersant is preferably from 1 to 200 parts by weight, and more preferably from 5 to 80 parts by weight, based on 100 parts by weight of the colorant. When the content is 1 part by weight or more, colorant dispersibility is satisfactory. When the content is 200 parts by weight or less, chargeability is good.

The toner constituents liquid may further include a wax.

Specific examples of usable waxes include, but are not limited to, aliphatic hydrocarbon waxes (e.g., low-molecular-weight polyethylene, low-molecular-weight polypropylene, polyolefin wax, microcrystalline wax, paraffin wax, SASOL wax), aliphatic hydrocarbon wax oxides (e.g., oxidized polyethylene wax) and block copolymers thereof, plant waxes (e.g., candelilla wax, carnauba wax, sumac wax, jojoba wax), animal waxes (e.g., bees wax, lanolin, spermaceti), mineral waxes (e.g., ozokerite, ceresin, petrolatum), waxes mainly composed of fatty acid esters (e.g., montanate wax, castor wax), and partially or completely deoxidized fatty acid esters (e.g., deoxidized carnauba wax).

The melting point of the wax is preferably from 70 to 140° C., and more preferably from 70 to 120° C., in view of a good combination of fixability and offset resistance. When the melting point is 70° C. or more, the toner has an improved blocking resistance. When the melting point is 140° C. or less, the toner has an improved hot offset resistance.

The content of the wax is preferably from 0.2 to 20 parts by weight, and more preferably from 0.5 to 10 parts by weight, based on 100 parts of the binder resin.

The melting point of wax is defined as a temperature at which the maximum endothermic peak is observed in an endothermic curve of the wax measured by differential scanning calorimetry (DSC).

An endothermic curve can be obtained by a high-precision inner-heat power-compensation differential scanning calorimeter based on a method according to ASTM D3418-82. An endothermic curve is obtained by heating a sample at a heating rate of 10° C./min after preliminarily heating and cooling the sample.

The toner may further include other additives, such as metal soaps, fluorine-based surfactants, dioctyl phthalate, conductivity imparting agents (e.g., tin oxide, zinc oxide, carbon black, antimony oxide), and fine powders of inorganic materials (e.g., titanium oxide, aluminum oxide, alumina), for the purpose of protecting electrostatic latent image bearing members and carriers, improving cleanability and fixability, controlling thermal, electric, and physical properties, and controlling electric resistance and melting point. The fine powders of inorganic materials may be optionally hydrophobized. The toner may further include other additives, such as lubricants (e.g., polytetrafluoroethylene, zinc stearate, polyvinylidene fluoride), abrasives (e.g., cesium oxide, silicon carbide, strontium titanate), anti-caking agents, and developability improving agents such as white or black particles having the opposite polarity to the toner particles.

For the purpose of controlling charge amount, the above-described additives may be treated with a silicone varnish, a modified silicone varnish, a silicone oil, a modified silicone oil, a silane-coupling agent, a silane-coupling agent having a functional group, or an organic silicon compound.

Particulate inorganic materials are preferably used as the external additive. Usable particulate inorganic materials include, but are not limited to, silica, alumina, and titanium oxide.

Additionally, fine particles of polymers prepared by soap-free emulsion polymerization, suspension polymerization, or dispersion polymerization (e.g., polystyrene, copolymers of methacrylates or acrylates), polycondensation polymers (e.g., silicone, benzoguanamine, nylon), and thermosetting resins are also usable as the external additive.

The surface of the additive may be hydrophobized so as to prevent deterioration of the additive itself even under high-humidity conditions. Specific examples of usable surface treatment agents include, but are not limited to, silane coupling agents, silylation agents, silane coupling agents having a fluorinated alkyl group, organic titanate coupling agents, aluminum coupling agents, silicone oils, and modified silicone oils.

The additive preferably has a primary particle diameter of from 5 nm to 2 μm, and more preferably from 5 to 500 nm. The additive preferably has a BET specific surface area of from 20 to 500 $m^2/g$. The content of the fine particles of the inorganic material in the toner is preferably from 0.01 to 5% by weight, and more preferably from 0.01 to 2% by weight.

The toner may further include a cleanability improving agent so as to be easily removable from an electrostatic latent image bearing member or a primary transfer medium when remaining thereon after image transfer. Specific materials usable as the cleanability improving agent include, but are not limited to, metal salts of fatty acids (e.g., zinc stearate, calcium stearate) and fine particles of polymers prepared by soap-free emulsion polymerization (e.g., polymethyl methacrylate, polystyrene). Preferably, fine particles of polymers have a relatively narrow size distribution and a volume average particle diameter of 0.01 to 1 μm.

Generally, as the particle size of toner decreases, dot and thin line reproducibility of the toner improves. However, when the particle size of toner is too small, the apparent adhesive force increases to lower developability and transferability. Thus, the volume average particle diameter (Dv) is preferably from 3 to 10 μm, more preferably from 3.0 to 8.0 μm, and most preferably from 4.0 to 6.0 μm.

The particle diameter distribution is represented by a ratio (Dv/Dn) of the volume average particle diameter (Dv) to the number average particle diameter (Dn). A toner satisfying an equation Dv/Dn=1 is a monodisperse toner having a uniform particle diameter.

Electrophotographic developing methods are of two types; one-component developing methods and two-component developing methods. There exists a particle diameter which can be easily developed in either developing methods. Because the particle diameter distribution of toner particles remaining in a developing device is varied and the image quality is changed as image development is repeated, the particle diameter distribution may be set as narrow as possible. However, it is generally difficult to narrow particle size distribution in known toner manufacturing methods. For example, the particle diameter distribution (Dv/Dn) of a typical pulverization toner is about from 1.2 to 1.4 in view of lowering of productivity in the classification process.

The toner according to an embodiment has a very narrow particle diameter distribution. The particle diameter distribution (Dv/Dn) is preferably within a range from 1.00 to 1.10, and more preferably within a range from 1.00 to 1.05, for obtaining extremely reliable images even after the image development is repeated.

The weight average particle diameter (Dv) and number average particle diameter (Dn) can be measured by a particle size analyzer MULTISIZER III (from Beckman Coulter, Inc.) and an analysis software program Beckman Coulter Multisizer 3 Version 3.51 as follows.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

Preparation of Colorant Dispersion

Primarily disperse 17 parts of a carbon black (REGAL 400 from Cabot Corporation) and 3 parts of a colorant dispersant (AJISPER PB821 from Ajinomoto Fine-Techno Co., Inc.) in 80 parts of ethyl acetate with a mixer equipped with agitation blades. Subject the resulting primary dispersion to a dispersion treatment with a bead mill filled with zirconia beads having a diameter of 0.3 mm (LMZ from Ashizawa Finetech Ltd.) to finely disperse the colorant by a strong shearing force. Thus, a secondary dispersion is prepared from which aggregates having a size of 5 μm or more have been completely removed.

Preparation of Wax Dispersion

Primarily disperse 18 parts of a carnauba wax and 2 parts of a wax dispersant in 80 parts of ethyl acetate with a mixer equipped with agitation blades. Heat the resulting primary dispersion to 80° C. while agitating it so that the carnauba wax is dissolved therein. Subsequently, cool the primary dispersion to room temperature to deposit particles of the carnauba wax at a maximum particle diameter of 3 μm or less.

The wax dispersant is a polyethylene wax to which a styrene-butyl acrylate copolymer is grafted. Subject the resulting dispersion to a dispersion treatment using a bead mill filled with zirconia beads having a diameter of 0.3 mm (LMZ from Ashizawa Finetech Ltd.) to finely disperse the wax into particles with a maximum particle diameter of 1 μm or less by a strong shearing force.

Preparation of Toner Constituents Liquid

Uniformly mix 100 parts of a polyester resin, 30 parts of the colorant dispersion, 30 parts of the wax dispersion, and 840 parts of ethyl acetate for 10 minutes with a mixer equipped with agitation blades. Either colorant or wax particles do not aggregate even when the mixture is diluted with a solvent.

Subject the toner constituents liquid to an operation of the toner manufacturing apparatus 1 illustrated in FIG. 10. The evaluation results of the resulting toner are described in Tables 2 and 3. Standards for evaluating the particle diameter distribution are summarized in Table 1.

TABLE 1

| | A | B | C | D |
|---|---|---|---|---|
| Particle diameter distribution Dv/Dn | $1.00 \leq Dv/Dn < 1.05$ | $1.05 \leq Dv/Dn < 1.10$ | $1.10 \leq Dv/Dn < 1.20$ | $1.20 \leq Dv/Dn$ |

Details of each element in the toner manufacturing apparatus 1 are described below. Liquid Column Resonance Liquid Droplet Discharge Device The length L between both longitudinal ends of the liquid column resonance liquid chamber 18 is 1.85 mm and the resonant mode N is 2. The first to fourth nozzles are provided to the position corresponding to an antinode of the pressure standing wave at the resonant mode N of 2. A drive signal generator is Function Generator WF1973 from NF Corporation and is connected to the vibration generator 20 with a lead wire covered with polyethylene. The drive frequency is 340 kHz, which is equal to the liquid column resonant frequency.

Toner Collection Part

The chamber 61 is a cylindrical member having an inner diameter of 400 mm and a height of 2,000 mm vertically fixed. The upper and lower ends of the chamber 61 are tapered. Both the airflow inlet and airflow outlet have a diameter of 50 mm. The liquid droplet discharge unit 2 is disposed to the center of the chamber 61 at a height 300 mm higher than the upper end of the chamber 61. The airflow is formed of nitrogen gas having a speed of 10.0 m/s and a temperature of 40° C.

Measurement of Particle Diameter

Size distribution of toner particles can be measured by a flow particle image analyzer FPIA-3000 (from Sysmex Corporation), for example.

First, add several drops of a nonionic surfactant (preferably CONTAMINON N from Wako Pure Chemical Industries, Ltd.) to 10 ml of water from which fine foreign substances have been previously removed by a filter and, as a result, containing particles having a circle-equivalent diameter which fall within the measuring range (e.g., not less than 0.60 μm and less than 159.21 μm) in a number only 20 or less per $10^{-3}$ cm$^3$. Add 5 mg of a sample (e.g., toner particles) to the water and subject the resulting liquid to a dispersion treatment for 1 minute at 20 kHz and 50 W/10 cm$^3$ using an ultrasonic disperser UH-50 (from SMT Corporation). Further subject the liquid to the dispersion treatment for 5 minutes in total. Thus, a sample dispersion is prepared containing 4,000 to 8,000 sample particles having a circle-equivalent diameter which fall within the measuring range of not less than 0.60 μm and less than 159.21 μm per $10^{-3}$ cm$^3$.

Next, pass the sample dispersion through a flow path (extending in a direction of flow) of a flat transparent flow cell (having a thickness of about 200 μm). A stroboscopic lamp and a CCD camera are respectively provided on opposite sides of the flow cell so that an optical path is formed crossing the thickness direction of the flow cell. While the sample dispersion is flowing, the stroboscopic lamp is emitting light at an interval of 1/30 seconds to obtain a two-dimensional image of the particles flowing in the flow cell that is parallel to at least a part of the flow cell. Calculate circle-equivalent diameter of each particle from the diameter of a circle having the same area as the two-dimensional image of the particle.

More than 1,200 particles can be subjected to the measurement of circle-equivalent diameter in about 1 minute in the above procedure. Thus, a number distribution and a ratio (% by number) of particles having a specific circle-equivalent diameter can be determined. In the resulting frequency and cumulative distributions (%), a range of 0.06 to 400 μm is divided into 226 channels (i.e., 1 octave is divided into 30 channels). The actual measuring range is not less than 0.60 μm and less than 159.21 μm.

Example 1

Figure 11:
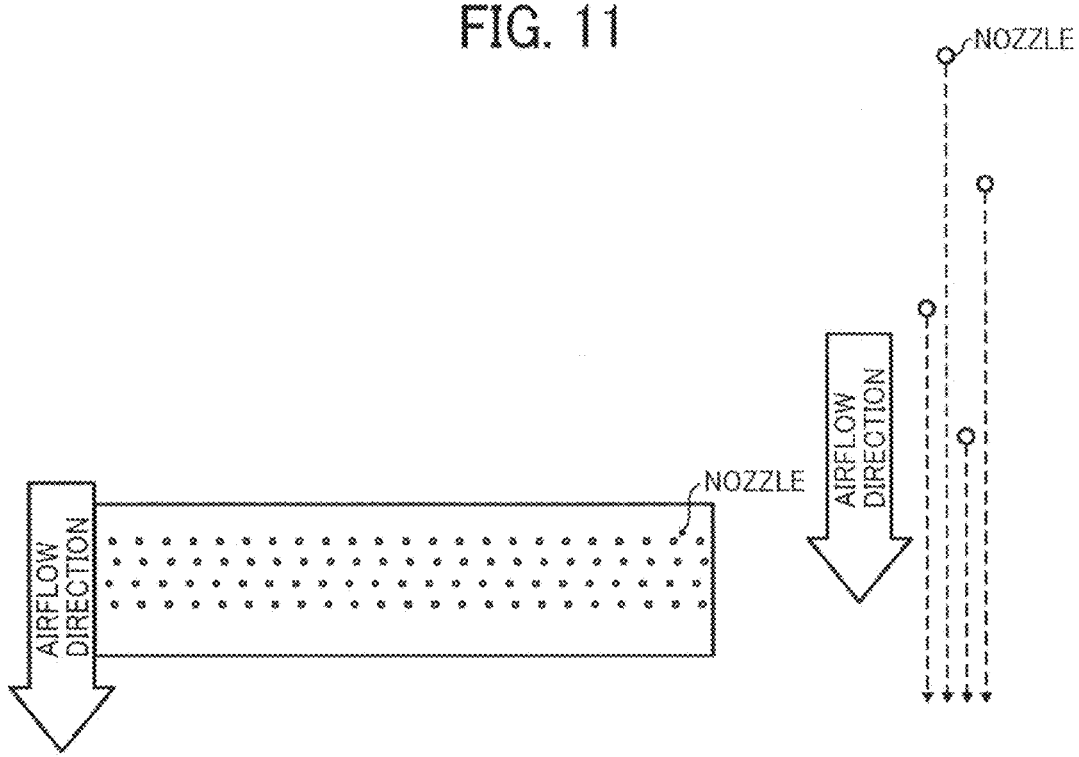
FIGS. 11 and 12 are views of nozzles used in Examples and Comparative Examples.

Discharge the above-prepared toner constituents liquid in the toner manufacturing apparatus 1 and collect the dried and solidified particles within the chamber 61 by a cyclone collector. Take out the resulting toner from a toner storage. Thus, a toner of Example 1 is obtained. The applied voltage sine wave peak value, frequency, and airflow velocity are shown in Table 2. The nozzles are arranged in a manner such that each of the nozzles does not overlap each other relative to the direction of the airflow, as illustrated in FIG. 11. In FIG. 11, an overall view of the nozzles is illustrated on the left and a magnified view of the nozzle arrangement is illustrated on the right. Immediately after the start of the discharge of liquid droplets, a photograph is obtained by a laser shadowgraphy. The liquid droplet diameter (μm) and discharge velocity (m/s) are determined from the photograph and are shown in Table 3. The particle size distribution is measured by a flow particle image analyzer FPIA-3000 (from Sysmex Corporation) under the above-described measurement conditions. Repeat the measurement for three times. The volume average particle diameter (Dv), number average particle diameter (Dn), and Dv/Dn are shown in Table 2.

Example 2

Repeat the procedure in Example 1 except for changing the airflow velocity to 10 m/s. The manufacturing conditions and evaluation results are shown in Tables 2 and 3.

Example 3

Repeat the procedure in Example 1 except for changing the airflow velocity to 6 m/s. The manufacturing conditions and evaluation results are shown in Tables 2 and 3.

Example 4

Repeat the procedure in Example 1 except for changing the applied voltage sine wave peak value to 12 V and the initial velocity of liquid droplet to 9.0 m/s (for satisfying $3d_0 \times f > V_0 > 2d_0 \times f$). The manufacturing conditions and evaluation results are shown in Tables 2 and 3. ($V_0$: discharge velocity, $d_0$: diameter of liquid droplet, f: drive frequency)

Example 5

Repeat the procedure in Example 1 except for changing the applied voltage sine wave peak value to 7 V and the initial velocity of liquid droplet to 6.0 m/s (for satisfying $V_0 < 2d_0 \times f$). The manufacturing conditions and evaluation results are shown in Tables 2 and 3. ($V_0$: discharge velocity, $d_0$: diameter of liquid droplet, f: drive frequency)

Example 6

Repeat the procedure in Example 1 except for changing the airflow velocity to 6 m/s, the applied voltage sine wave peak value to 7.0 V, and the initial velocity of liquid droplet to 6.0 m/s (for satisfying $V_0 < 2d_0 \times f$). The manufacturing conditions and evaluation results are shown in Tables 2 and 3. ($V_0$: discharge velocity, $d_0$: diameter of liquid droplet, f: drive frequency)

Example 7

Repeat the procedure in Example 1 except for replacing the liquid droplet discharge device with a film-vibration-type liquid droplet discharge device 102 disclosed in JP-2008-292976-A (FIGS. 14 to 16). The nozzles in this film-vibration-type injection device are arranged in a manner such that each of the nozzles does not overlap each other relative to the direction of the airflow, as illustrated in FIG. 11. The airflow velocity is 18 m/s. The applied voltage to the vibration generator is 20.0 V and the frequency of the film vibration is 98 kHz. The obtained toner has a volume average particle diameter (Dv) of 5.40 μm and the particle size distribution Dv/Dn is 1.07.

Comparative Example 1

Figure 12:
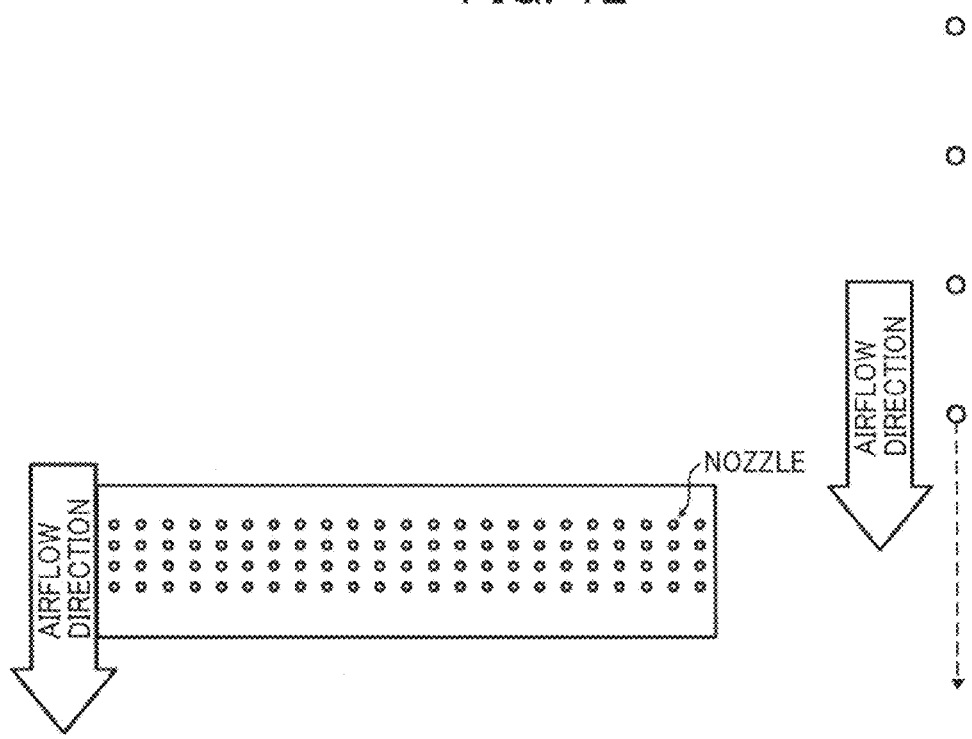

Repeat the procedure in Example 1 except for replacing the nozzles with other nozzles which are arranged in a manner such that each of the nozzles overlaps each other relative to the direction of the airflow, as illustrated in FIG. 12. In FIG. 12, an overall view of the nozzles is illustrated on the left and a magnified view of the nozzle arrangement is illustrated on the right. The manufacturing conditions and evaluation results are shown in Tables 2 and 3.

Comparative Example 2

Repeat the procedure in Comparative Example 2 except for changing the airflow velocity to 6 m/s, the applied voltage sine wave peak value to 7.0 V, and the initial velocity of liquid droplet to 6.0 m/s (for satisfying $V_0 < 2d_0 \times f$). The manufacturing conditions and evaluation results are shown in Tables 2 and 3. ($V_0$: discharge velocity, $d_0$: diameter of liquid droplet, f: drive frequency)

TABLE 2

|  | Drive frequency (kHz) | Applied voltage sine wave peak value (V) | Nozzle arrangement | Airflow velocity (m/s) |
|---|---|---|---|---|
| Example 1 | 340 | 16 | FIG. 11 | 18 |
| Example 2 | 340 | 16 | FIG. 11 | 10 |
| Example 3 | 340 | 16 | FIG. 11 | 6 |
| Example 4 | 340 | 12 | FIG. 11 | 18 |
| Example 5 | 340 | 7 | FIG. 11 | 18 |
| Example 6 | 340 | 7 | FIG. 11 | 6 |
| Comparative Example 1 | 340 | 16 | FIG. 12 | 18 |
| Comparative Example 2 | 340 | 7 | FIG. 12 | 6 |

TABLE 3

|  | Initial velocity of liquid droplets V0 (m/s) | Diameter of liquid droplets d0 (μm) | Volume average particle diameter of toner Dv (μm) | Number average particle diameter of toner Dn (μm) | Particle diameter distribution Dv/Dn | Evaluation for Dv/Dn |
|---|---|---|---|---|---|---|
| Example 1 | 15.0 | 11.9 | 5.21 | 5.10 | 1.02 | A |
| Example 2 | 15.0 | 11.9 | 5.40 | 5.23 | 1.03 | A |
| Example 3 | 15.0 | 11.9 | 5.52 | 5.24 | 1.05 | A |
| Example 4 | 9.0 | 11.2 | 5.49 | 5.23 | 1.05 | A |
| Example 5 | 6.0 | 10.5 | 5.65 | 5.23 | 1.08 | B |
| Example 6 | 6.0 | 10.5 | 5.73 | 5.24 | 1.09 | B |
| Example 7 | 7.0 | 12.0 | 5.93 | 5.55 | 1.07 | B |
| Comparative Example 1 | 15.0 | 11.9 | 6.29 | 5.34 | 1.18 | C |
| Comparative Example 2 | 6.0 | 10.5 | 6.95 | 5.29 | 1.31 | D |

Additional modifications and variations in accordance with further embodiments of the present invention are possible in light of the above teachings. It is therefore to be understood that within the scope of the appended claims the invention may be practiced other than as specifically described herein.

What is claimed is:

1. An apparatus for manufacturing fine particles, comprising:

a liquid droplet discharge device having multiple nozzles, the liquid droplet discharge device adapted to discharge a liquid from the multiple nozzles to form the liquid into liquid droplets, the liquid comprising a solvent in which constituents of the fine particles are dissolved or dispersed or a melt of constituents of the fine particles; and a liquid droplet solidification device adapted to solidify the liquid droplets by an airflow;

wherein a direction of the airflow is perpendicular to a direction of discharge of the liquid, and the multiple nozzles are arranged in a manner such that a travel path starting from any one nozzle will not intercept another nozzle, where the travel path is in the same direction as the airflow.

2. The apparatus according to claim 1, wherein the liquid droplet discharge device includes a liquid column resonance liquid chamber to be supplied with the liquid, and wherein when a vibration is applied to the liquid in the liquid column resonance liquid chamber, a liquid column resonant standing wave is formed therein and the liquid is discharged from the multiple nozzles disposed within an area corresponding to an antinode of the liquid column resonant standing wave.

3. The apparatus according to claim 1, further comprising a rectifier adapted to rectify the airflow at a windward side of the multiple nozzles.

4. The apparatus according to claim 1, wherein a velocity of the airflow is 7 m/s or more.

5. The apparatus according to claim 1, wherein a velocity of the airflow is 15 m/s or more.

6. The apparatus according to claim 1, wherein the following inequation is satisfied:

$$V_0 \geq 2d_0 \times f$$

wherein $V_0$ represents a discharge velocity, $d_0$ represents a diameter of the liquid droplets, and f represents a drive frequency.

7. The apparatus according to claim 1, wherein the following inequation is satisfied:

$$V_0 \geq 3d_0 \times f$$

wherein $V_0$ represents a discharge velocity, $d_0$ represents a diameter of the liquid droplets, and f represents a drive frequency.

8. The apparatus according to claim 1, wherein the liquid is a toner constituents liquid containing a resin and the fine particles are toner particles.

9. The apparatus according to claim 8, wherein the toner particles have a volume average particle diameter of from 3 to 10 μm.

10. The apparatus according to claim 8, wherein a particle diameter distribution represented by a ratio (Dv/Dn) of a volume average particle diameter (Dv) to a number average particle diameter (Dn) of the toner particles is from 1.00 to 1.10.

11. The apparatus according to claim 1, wherein their airflow is formed of air or a noncombustible gas.

12. The apparatus according to claim 11, wherein the airflow is formed of a noncombustible gas.

13. The apparatus according to claim 12, wherein the noncombustible gas is nitrogen.

14. The apparatus according to claim 1, further comprising a drying collection unit.

15. The apparatus according to claim 14, wherein the drying collection unit comprises a fluidized-bed dryer or a vacuum dryer.

16. The apparatus according to claim 3, wherein the rectifier is a structural body formed by arranging three-dimensional structures without any space between the three-dimensional structures.

17. The apparatus according to claim 1, wherein the multiple nozzles are arranged in a two-dimensional plane.

18. The apparatus according to claim 2, wherein the multiple nozzles are aligned in a direction perpendicular to the direction of the airflow.

* * * * *